US012692098B2

(12) United States Patent
Karpov et al.

(10) Patent No.: US 12,692,098 B2
(45) Date of Patent: Jul. 28, 2026

(54) TRANSPORT SYSTEM

(71) Applicant: OMNIMOD AS, Fornebu Oslo (NO)

(72) Inventors: Vsevolod Arkadiivich Karpov, Fornebu Oslo (NO); Tobias Drage Roti, Fornebu Oslo (NO); Bo Willem Woelfert, Fornebu Oslo (NO); Marius Hamre Nordrik, Fornebu Oslo (NO); Bjorn Thoralf Brodtkorb, Fornebu Oslo (NO)

(73) Assignee: OMNIMOD AS, Fornebu Oslo (NO)

( * ) Notice: Subject to any disclaimer, the term of this patent is extended or adjusted under 35 U.S.C. 154(b) by 102 days.

(21) Appl. No.: 18/292,807

(22) PCT Filed: Jul. 28, 2022

(86) PCT No.: PCT/EP2022/071213
§ 371 (c)(1),
(2) Date: Jan. 26, 2024

(87) PCT Pub. No.: WO2023/006886
PCT Pub. Date: Feb. 2, 2023

(65) Prior Publication Data
US 2025/0083905 A1      Mar. 13, 2025

(30) Foreign Application Priority Data
Jul. 28, 2021    (WO) ................ PCT/EP2021/071201

(51) Int. Cl.
*B65G 13/11*          (2006.01)
*B65G 13/10*          (2006.01)
(Continued)

(52) U.S. Cl.
CPC ............. *B65G 47/64* (2013.01); *B65G 13/10* (2013.01); *B65G 43/08* (2013.01); *B65G 47/642* (2013.01);
(Continued)

(58) Field of Classification Search
CPC ........ B65G 13/11; B65G 43/08; B65G 47/64; B65G 47/642; B65G 39/025
(Continued)

(56) References Cited

U.S. PATENT DOCUMENTS 3,978,975 A * 9/1976 Herbes ................. B65G 13/065
198/782
7,284,653 B2 * 10/2007 Fourney ................. B65G 17/24
198/779
(Continued)

FOREIGN PATENT DOCUMENTS

CN          205471616 U       8/2016
CN          110271013         9/2019
(Continued)

OTHER PUBLICATIONS

International Search Report and Written Opinion issued in PCT/EP2021/071201 Dated Apr. 29, 2022.
(Continued)

*Primary Examiner* — Douglas A Hess
(74) *Attorney, Agent, or Firm* — Foley & Lardner LLP

(57)          ABSTRACT
A conveying system for conveying objects comprising: a plurality of conveyor modules, each conveyor module comprising: at least one rotatable element comprising an engagement surface configured to engage with a surface of an object to be conveyed; a driving mechanism configured to rotate the at least one rotatable element such that rotation of the at least one rotatable element causes rotation of the engagement surface and thereby movement of the object; and a control mechanism configured to control rotation of the rotatable element via the driving mechanism; and a conveying frame comprising: a plurality of apertures, each aperture configured to receive a conveyor module so as to form an array of conveyor modules that together provide a substantially planar surface for conveying objects thereon; a
(Continued)

control system configured to communicate with the control mechanism of the conveyor module; wherein each conveyor module is configured to be releasably mounted within an aperture; wherein mounting a conveyor module within an aperture establishes an electrical connection between the control mechanism and the control system, which facilitates electrical communication between the control system and the mounted conveyor module.

18 Claims, 29 Drawing Sheets

(51) Int. Cl.
    *B65G 43/08*     (2006.01)
    *B65G 47/64*     (2006.01)

(52) U.S. Cl.
    CPC .. *B65G 2203/0216* (2013.01); *B65G 2207/30* (2013.01); *B65G 2207/34* (2013.01)

(58) Field of Classification Search
    USPC ............................................ 198/370.09, 779
    See application file for complete search history.

(56) References Cited

U.S. PATENT DOCUMENTS

| | | | | |
|---|---|---|---|---|
| 8,978,879 B2 * | 3/2015 | Fourney | ............... | B65G 47/244 |
| | | | | 198/782 |
| 9,499,341 B2 * | 11/2016 | Wilkins | ............... | B65G 39/025 |
| 9,630,781 B1 * | 4/2017 | Ogle, II | .................. | B65G 47/53 |
| 10,493,927 B1 | 12/2019 | Widmer et al. | | |
| 10,518,975 B2 * | 12/2019 | Itoh | ........................ | B65G 43/00 |
| 11,008,175 B1 * | 5/2021 | Watts | ..................... | F16M 13/02 |
| 11,091,325 B2 * | 8/2021 | Kim | ........................ | B65G 39/12 |
| 11,365,064 B2 * | 6/2022 | Tachibana | .............. | B65G 21/14 |
| 11,760,575 B2 * | 9/2023 | Itoh | ......................... | B65G 39/00 |
| | | | | 193/36 |
| 2003/0234155 A1 | 12/2003 | Kanamori et al. | | |
| 2020/0122932 A1 | 4/2020 | Guglielmi et al. | | |
| 2021/0139244 A1 | 5/2021 | Itoh et al. | | |
| 2021/0269245 A1 | 9/2021 | Huang et al. | | |
| 2023/0135278 A1 | 5/2023 | Mukai | | |

FOREIGN PATENT DOCUMENTS

| | | | |
|---|---|---|---|
| CN | 111069057 A | 4/2020 |
| CN | 210594104 U | 5/2020 |
| CN | 112591410 A | 4/2021 |
| CN | 112777192 A | 5/2021 |
| DE | 10 2010 015 584 A1 | 10/2011 |
| EP | 3 459 881 A1 | 3/2019 |
| JP | H11-199030 A | 7/1999 |
| JP | 2004-075387 A | 3/2004 |
| JP | 2018-039628 | 3/2018 |
| KR | 10-2014-0140785 A | 12/2014 |
| KR | 10-2017-0004753 | 1/2017 |
| TW | 1721799 B | 3/2021 |
| WO | WO-2017/200019 A1 | 11/2017 |
| WO | WO-2021/124430 | 6/2021 |

OTHER PUBLICATIONS

International Search Report and Written Opinion issued in PCT/EP2022/071213 Dated Nov. 15, 2022.

JP Office Action on patent application No. 2024-505251 dated Oct. 7, 2025.

* cited by examiner

TRANSPORT SYSTEM

FIELD OF THE INVENTION

The present invention relates to a system for moving a plurality of objects within an object transport system.

BACKGROUND

Sorting systems, for example for package sorting systems, typically include a conveying system which is able to receive packages and route them to their destination. The conveying system includes a transporting surface, such as a conveyor belt or a system of cooperating wheels, on which the package rests and is moved about by a central control system. The transporting surfaces can take a number of different forms, as follows.

A first example conveying system includes a conveyor belt ring having multiple feed-in and feed-out paths attached to the main ring. Packages are conveyed to the central ring via the feed-in conveying paths and are transported round the ring until each package reaches its designated fee-out conveyor path. A problem with this system is that the conveying system is a generally large, fixed system of conveyor belts and so flexibility of the conveying paths is very limited. Furthermore, these systems are typically too large and expensive to be accessible to small and medium sized facilities. These systems are not able to easily adjust their functionality or configuration.

A second example conveying system includes a shuttle robot system in which carrier robots move around a floor to collect and distribute packages around different locations on the floor. However, this system is only able to move packages in two dimensions. Further, a limited number of carrier robots operate at a given time and so the number of packages being transported at a given time is also limited. In addition, carrier robots on the other hand are designed to carry objects of fixed size, thus being inefficient in situations where there is large variability in size of the objects that need to be handled.

A third example conveying system includes transportation layer for the transportation of packages and a storage layer for storage of packages. A robot moves packages through the transportation layer to its desired location on the storage layer. The packages are moved in containers which are designed to fit the transportation layer. However, due to the use of containers to transport the packages, there is a limit of the size of the package that can be transported through the system within the container. Additionally, using containers of a fixed size is an inefficient use of space if small packages are being handled.

Some conveying systems include conveyor belts that can move parcels in all directions, known as omnidirectional conveyor belts. The conveyor belt is controlled by a control system that sends commands to a driving system. The systems often include multiple floor segments, each floor segment having a multiple omnidirectional wheels arranged within the segment. The omnidirectional wheels in each segment are connected by wires to the control system. In some cases, the segments can be lifted up out of the floor to inspect the wiring. These systems are capable of high throughput but generally do not have high precision.

Traditional e-commerce automation solutions are big, bulky, expensive, typically lacking ease of scalability and/or having restrictions with regards to exploitation of space in all three dimensions. Additionally, many of the solutions do not allow for high flexibility in run-time, with their functionality parameters often set in stone by the specific hardware configuration, leaving little room for on-demand operation adjustment and optimization.

It would be desirable to have a flexible, modular hardware system that allows for operation in at least two dimensions, and preferably in three dimensions, powered by software that allows for on demand adjustment and optimization of functionality.

SUMMARY

According to a first aspect there is provided a conveying system for conveying objects comprising a plurality of conveyor modules. Each conveyor module comprises at least one rotatable element comprising an engagement surface configured to engage with a surface of an object to be conveyed, a driving mechanism configured to rotate the at least one rotatable element such that rotation of the at least one rotatable element causes rotation of the engagement surface and thereby movement of the object, and a control mechanism configured to control rotation of the rotatable element via the driving mechanism. The conveying system for conveying objects also comprises a conveying frame comprising a plurality of apertures, each aperture configured to receive a conveyor module so as to form an array of conveyor modules that together provide a substantially planar surface for conveying objects thereon and a control system configured to communication with the control mechanism of the conveyor module. Each conveyor module is configured to be releasably mounted within an aperture. By mounting a conveyor module within an aperture, an electrical connection between the control mechanism and the control system is established, which facilitates electrical communication between the control system and the mounted conveyor module.

The conveyor module can simply be inserted into the conveying frame without having to use any screws or other fixings to retain the conveyor module in place. Similarly, the conveyor module can simply be removed from the conveying frame by lifting it out of the conveying frame, without having to undo any fixings. Each conveyor module is compact, simple in its design, and allows for easy placement and removal from the conveying frame. Each conveyor module comprises an integrated gear based power transmission system, which helps provide a compact conveyor module.

The conveying system for conveying objects provides the ability to move objects of any size, move objects freely in any direction, and move several objects simultaneously, in different directions and without any restrictions on how many objects can be moved at the same time.

The electrical connection established between the control mechanism of the conveyor module and the control system of the conveying frame may be provided by a physical connection between the control mechanism and control system. In some examples, the physical connection may be a direct physical connection. This helps ensure secure electrical connection and electrical communication between the control mechanism and the control system.

Preferably the rotatable element is an omnidirectional wheel. This provides active driven movement in a first and second direction, the first and second directions opposite to each other for example forwards and reverse directions. The omnidirectional wheel also provides passive movement in a third and fourth direction, the third and fourth direction opposite to each other and perpendicular to the first and second directions for example left and right directions.

Omnidirectional wheels provide a convenient mechanism for providing motion in multiple directions, including perpendicular directions, which reduces the overall number of components present in the conveyor module.

In some examples, the at least one rotatable element may comprise an aperture having a shape that is configured to interlock with a shaft of the driving mechanism. Having a rotatable element that interlocks with a driving shaft may allow the rotatable element to be fixedly mounted to the shaft through the interlocking mechanism alone, rather than additional fixing components. This helps reduce the complexity of the conveyor module. In addition, the rotatable element may engage with a shaft of the driving mechanism such that rotation of the shaft automatically causes rotation of the rotatable element.

The aperture preferably has a cross-section comprising a plurality of recesses or indentations that are configured to engage, for example in an interlocking manner, with corresponding ridges or protrusions on the shaft of the driving mechanism.

The plurality of recesses may be equally spaced around the circumference of the aperture. Preferably, there are two or more recesses. In some developments, the aperture may have a cross-section comprising four recesses. In this case, the aperture may be considered to be cross-shaped aperture and preferably the corresponding shaft comprises four ridges having a cross-shaped cross-sectional profile. In other developments, the aperture may comprise five recesses, and so the aperture may be considered to have a star-shaped profile configured to engage with a shaft having a corresponding start-shaped cross-sectional profile. As will be appreciated, any number of recesses and corresponding ridges may be used, for example, two, three, six, or seven or more. An aperture comprising a plurality of recesses and a shaft comprising corresponding ridges provide a simple but effective means of providing the required interlocking engagement between the rotatable element and the shaft to couple them together.

The driving mechanism may comprise a motor. The motor may comprise an engaging means configured to retain the motor in place within the conveyor module. This may prevent the motor from moving laterally within the conveyor module.

The engaging means may comprise a plurality of protrusions extending from the motor. The protrusions may be configured to engage with corresponding recesses within the conveyor module. The protrusions may be located substantially opposite each other, located around a circumference of the motor.

Preferably, the conveyor module may comprise a through passageway extending between a first opening in a top part of the conveyor module and second opening in a base of the conveyor module. The through passageway may pass completely through the conveyor module. The through passageway may allow water, dust, or other debris to pass through the conveyor module so that water and/or debris does not build up within the conveyor module.

In some examples, the at least one rotatable element may be at least partially located within the through passageway. This may allow any water and/or debris that has collected on the rotatable element to pass through the conveyor module via the through passageway. Thus, this arrangement may help ensure that any fluids or foreign objects which come into contact with the rotatable element can exit the housing of the conveyor module so that motion of the rotatable element is not affect or hindered. In addition, this arrangement provides a compact design for the overall conveyor module, rather than having a separate through passageway.

Preferably, the though passageway is arranged to allow fluid or objects to pass through the through passageway from the first opening to the second opening under the action of gravity. The through passageway may be orientated substantially vertically when the conveyor module is held in its operative configuration. This provides a passive drainage system within the conveyor module and so may allow for water and debris to be removed from the conveyor module without the need for an active drainage or removal system.

Preferably, the control mechanism comprises a printed circuit board (PCB). A PCB may facilitate electrical connections without the need for wires. This may facilitate easy assembly of the conveyor module. In some examples, the printed circuit board may be arranged to extend from the conveyor module, preferably arranged to extend externally from the conveyor module. The control system may also comprise a printed circuit board. The control mechanism and the control system may each comprise a printed circuit board.

In some examples, the conveyor module may comprise a housing configured to at least partially house the at least one rotatable element, the control mechanism, and the driving mechanism. The housing may act as a full enclosure which isolates the internal components from water and dust.

In some examples, a portion of the control mechanism may extend beyond the housing. This may facilitate easy access to the control mechanism for electrical connections.

Preferably, the portion of the control system which extends beyond the housing is arranged to engage with the control system of the conveying frame. This provides an easy mechanism for electrically connecting the conveyor module to the conveying frame, without the need for wires.

The conveying frame may comprise a baseplate. The baseplate may provide a structure onto which other components may be attached.

The baseplate may comprise a first slot configured to receive the portion of the control mechanism. The baseplate may comprise a second slot configured to receive a portion of the through passageway. The slots may ensure that the conveyor module has engaged with the conveying frame, through engagement of the portion of the control mechanism and/or the portion of the through passageway with the baseplate of the conveying frame. This may help ensure that the conveyor module is securely inserted into the conveying frame and may help prevent unwanted lateral movement of the conveyor module within the conveying frame.

Preferably, the portion of the through passageway extends further away from the housing than the portion of the control mechanism. This may have the effect that when the conveyor module is inserted into the conveying frame, the second slot receives the portion of the through passageway before the first slot receives the portion of the control mechanism. This may ensure that the conveyor module is correctly aligned within the aperture, before the electrical connection between the conveyor module and the conveying frame is made via the portion of the control mechanism. This may ensure a stable electrical connection is made between the conveyor module and the conveying frame.

The housing may comprise a plurality of flanges. The plurality of flanges may be configured to engage with the conveying frame, in particular when the conveyor module is mounted within the aperture of the conveying frame. The flanges may be located substantially opposite each other. The flanges may allow the conveyor module to rest on a portion of the conveying frame, and so the flanges may help support the conveyor module within the conveying frame. In particular, the flanges may help support the housing in the conveying frame. The flanges may therefore be considered as a form of support member, and the flanges may be arranged to support the weight of the conveyor module on the conveying frame when the conveyor module is mounted within the conveying frame. The flanges may help ensure that the conveyor module is not inserted too far into the conveying frame.

Preferably, each of the plurality of flanges tapers outwardly away from the housing. This may help provide sufficient surface area of the flange on which to support the housing when the conveyor module is mounted in the conveying frame.

In some examples, the flanges may be substantially triangular in side profile. The flanges may be arranged to form a right-angled triangle shape.

In some examples, the housing may comprise a pair of flanges provided on opposing sides of the housing, such that each flange of the pair of flanges are located opposite each other. The housing may comprise a first pair of opposing sides and a second pair of opposing sides, wherein a length of the first pair of opposing sides is greater than a length of the second pair of opposing sides. Preferably, the pair of flanges may be provided on the first pair of opposing sides of the housing. In other words, if the housing has a rectangular shape the pair of flanges are provided on the two longer sides of the housing.

The housing may comprise a lid arranged to provide an upper external surface of the conveyor module. The lid is preferably rectangular. The lid may be rectangular and the housing may be square. The lid may comprise a first pair of opposing sides and a second pair of opposing sides, wherein a length of the first pair of opposing sides is greater than a length of the second pair of opposing sides. Preferably, the pair of flanges may be provided on opposing sides of the housing that correspond to the first opposing sides of the lid having the smaller dimensions, e.g. the width sides of the lid. In other words, if the housing has a square shape and the lid has a rectangular shape, the pair of flanges are provided on the two sides of the housing corresponding to the two longer sides of the lid.

In some examples, each flange of the pair of flanges extends down said opposing sides of the housing and gradually extends away from each of said opposing sides to form a lower surface on each flange that extends out from the side of the housing in a perpendicular direction, in order to provide a supporting surface for resting on the conveyor frame, for example wherein the support members taper outwardly as they extend down said opposing sides of the housing. Preferably, the supporting surface provided by the lower surface of each flange is substantially parallel with an upper surface of the housing. This may help ensure that the conveyor module is correctly aligned within the aperture of the conveying frame, for example that the conveyor module is mounted substantially vertically within the conveying frame.

In some examples, the housing may comprise a track extending around a perimeter of the housing. The track may be configured to receive a length of elastically deformable material. The material may help provide a snug fit between the conveyor module and the conveying frame when the conveyor module is inserted into the conveying frame. This may prevent the conveyor module moving around within an aperture of the conveying frame, which may disrupt electrical connections.

The conveyor module preferably comprises at least one magnetic portion. The at least one magnetic portion may be located on an upper external surface of the conveyor module when the conveyor module is in its operative configuration. The magnetic portion may allow the conveyor module to be handled, for example picked up and moved around, by an electromagnetic. The at least one magnetic portion may comprise a magnetic material for engagement by an electromagnet for removal and insertion of the conveyor module into the conveyor frame. This may provide a simple and convenient mechanism for inserting and removing a conveyor module from a conveying frame.

To facilitate contact between an electromagnet and the conveyor module, the magnetic portion is preferably located on an external surface of the conveyor module, and preferably a surface of the conveyor module that remains exposed when the conveyor module is inserted into the conveying frame. Thus, preferably, the magnetic portion is located on an upper external surface of the conveyor module.

The magnetic portion may comprise any suitable magnetic material, for example iron, steel, or nickel.

More than one magnetic portion may be present on the conveyor module. For example two or more magnetic portions. The magnetic portions may also be referred to as magnetic contact points. Providing more than one magnetic contact point may help provide a stable connection between the electromagnet and the conveyor module. This may reduce unwanted movement between the electromagnet and the conveyor module when the electromagnet is handling the conveyor module. As will be appreciated, any suitable number of magnetic portions may be present for example four or more magnetic portions. The plurality of magnetic portions may be spaced apart around the perimeter of the upper external surface of the conveyor module. In some cases the plurality of magnetic portions may be equally spaced apart from each other. In other cases, the plurality of magnetic portions may be randomly spaced apart from each other.

In some examples, the one or more magnetic portion may take the form of a metal plate. In other examples, the one or more magnetic contact may take the form of at least one screw that may be at least partially screwed into the conveyor module. However, as will be appreciated, any other suitable means for incorporating a magnetic portion into the conveyor module may be used.

The conveyor module may further comprise a casing. The casing may be configured to at least partially house the control mechanism and at least partially house the driving mechanism. In particular, the casing is configured to house a motor of the driving mechanism. The casing may be configured to at least partially house a printed circuit board of the control mechanism. The casing may help to protect part of the control mechanism and part of the driving mechanism.

Preferably, the casing is external to the housing. In this way, the casing may be considered as a separate component to the housing. Thus, part of the control mechanism and part of the driving mechanism are not within the housing and so can be considered as independent from and separate to the housing. This arrangement provides easy access to at least part of the driving mechanism and at least part of the control mechanism, allowing for faster replacement of these components.

The casing may be releasably attached to the housing. This may allow the casing to be removed from the housing so that the casing and/or components housed within the casing may be repaired or replaced.

In some examples, an interlocking mechanism, for example an interlocking hook mechanism, may be used to releasably attach the casing to the housing. The interlocking mechanism may comprise a first interlock member, which may be in the form of a first hook, which may be located on the casing and a second interlock member, which may be in the form of a second hook, which may be located on the housing. The first and second interlock members may be arranged to releasably engage with each other, for example releasable sliding engagement, in order to releasably attach the casing to the housing. Thus, the first and second hooks may be configured to releasably engage with each other. In this way, the housing may be arranged to at least partially support the weight of the casing.

A portion of the control mechanism may be arranged to extend beyond the casing. Preferably, a distal portion of the control mechanism is arranged to extend beyond the casing. In this way, part of the control mechanism is not housed within the casing. This may facilitate easy access to the control mechanism for electrical connections. Preferably the distal portion which extends beyond the casing comprise at least part of the printed circuit board of the control mechanism.

Preferably, the portion of the control mechanism that extends beyond the casing may comprise at least one chamfer. This portion of the control mechanism may comprise an end having a taper. This design may help ensure correct alignment of the control mechanism with the control system. In addition, less precision is required when establishing an electrical connection between the control mechanism and the control system and so the chamfer or taper allows for a higher degree of misalignment before an electrical connection will fail to be made.

In some examples, at least one corner at a distal end of the printed circuit board of the control mechanism is chamfered. Preferably, an opposing pair of corners at the distal end of the printed circuit board are chamfered. This design may help ensure correct alignment of the control mechanism with the control system.

The conveying system may comprise a socket. The socket may be part of the conveying frame. The socket is preferably configured to at least partially house at least part of the control system. The socket may protect at least part of the control system from damage.

In some examples the socket comprises an opening, the opening configured to allow the conveyor module to establish an electrical connection between the control mechanism and the control system of the conveying frame. The socket may be configured to provide a guide to facilitate electrical connection between the control mechanism and the control system.

Preferably, the opening of the socket comprises at least one internal side which tapers inwardly from the opening in the socket towards the control system housed within the socket. The socket may comprise at least one chamfered internal side. However, in some examples, the socket may comprise at least one pair of chamfered internal sides which taper inwardly, and preferably wherein all the internal sides of the socket are chamfered and/or tapered, for example to form a truncated inverse-pyramid configuration.

In some examples, the socket may comprise a substantially funnel shaped opening. The funnel shaped opening extends from control mechanism towards the control system facilitating establishment of an electrical connection between the conveyor module and the conveying frame.

The conveyor module may comprise a housing configured to at least partially house the at least one rotatable element.

The housing of the conveyor module may comprises a locking mechanism. The locking mechanism may be configured to attach a first housing part to a second housing part. The first housing part may be an upper surface of the housing, such as a lid portion. The second housing part may be a side portion for example a side plate, such as a side plate for covering at least part of the driving mechanism. In this way, the housing may be considered as comprising a first housing part arranged to at least partially enclose the rotatable element, a second housing part arranged to enclose at least part of the driving mechanism, and a locking mechanism configured to secure the first and second housing parts together. The locking mechanism may comprise at least one locking tab. The locking tab may be provided on the first housing part. The locking tab may be configured to engage with a locking feature provided on the second housing part. The locking mechanism may be integral to the housing. In this way, the locking mechanism is not a separate component and so the overall number of individual components is reduced which reduces manufacturing costs.

Preferably, the housing comprises a lid portion and more preferably the lid portion has a rectangular outer perimeter, which may help prevent unwanted movement of the conveyor module when the conveyor module is mounted with the conveying frame. In addition, the rectangular perimeter may facilitate correct orientation of the conveyor module within the conveying frame.

In some developments, the lid portion comprises substantially triangular corners. The triangular corners may be preferably rounded corners rather than pointed corners. Advantageously, rounded corners may help prevent objects or packaging from becoming caught on the corner. The triangular corners may also help spread the load of the objects being conveyed over the transporting surface.

According to another aspect there is provided a conveyor module for a conveying system for conveying objects, the conveyor module comprising at least one rotatable element comprising an engagement surface configured to engage with a surface of an object to be conveyed and a housing wherein the at least one rotatable element is arranged to be rotatably mounted within a chamber defined by the housing. The housing comprising a first opening to the chamber, wherein at least a portion of the engagement surface extends through the first opening. The conveyor module further comprises a lid arranged to at least partially cover the first opening, wherein the lid comprises an aperture arranged to receive the portion of the engagement surface that extends through the first opening, and a through passageway extending between the aperture in the lid and a second opening in a base of the housing. The through passageway is arranged such that any fluid, dust, debris, or the like that enters the chamber through the aperture in the lid can exit the chamber via the through passageway.

The through passageway prevents the chamber in the housing from becoming blocked by unwanted foreign objects which may affect the ability of the rotatable element to rotate, and so may prevent the conveyor module from operating correctly. The through passageway extends from the top of the conveyor module to the bottom of the conveyor module, completely through conveyor module, providing an efficient passageway for foreign objects and fluids to pass quickly through the conveyor module.

Preferably, the base of the housing is sloped and the second opening is located at a lowermost part of the slope. That is, the base of the chamber defined by the housing is preferably sloped. The through passage may be arranged to pass through a position on the base that is located towards a lowermost part of the sloped base. This helps ensure that fluids of foreign objects tend to move towards the second opening and exit the housing, rather than gathering on a flat base on the housing which may block up the housing The through passageway may comprise a chute configured to extend from the second opening in the base of the housing, away from the housing. Thus, in some examples, the chute may extend from the base of the chamber to a position beneath the housing. This may ensure that fluids or foreign objects exit the housing a distance away from the main body of the housing such that there is reduce chance of said fluids or foreign objects interfering with (e.g. blocking) any internal part of the housing.

The lid may be configured to form at least part of a transport surface for conveying objects across when used in combination with lids of other such conveyor modules. In this way, multiple conveyor modules may cooperate with each other to form a larger transport surface. In addition, the area of the transport surface may be easily adjusted by varying the number of conveyor modules that are sued to form the transport surface. This module arrangement is a simple and effective way of building a transport surface of any size and shape.

Preferably, the lid comprises a rectangular outer perimeter. In this way, the lid may be substantially quadrangular (in particular rectangular) in shape, having two sides that define a width of the lid and two sides that define a length of the lid, wherein the dimensions of the width sides are different (e.g. shorter) to the dimensions of the length sides. A rectangular outer perimeter may help prevent unwanted movement of the conveyor module when the conveyor module is mounted within the conveying frame. In addition, the rectangular perimeter may facilitate correct orientation of the conveyor module within the conveying frame.

The lid may comprise at least one corner having a substantially triangular protrusion. The triangular protrusion may be configured to cooperate with a corresponding triangular protrusion on another similar conveyor module.

In this way, the triangular protrusion may be configured to substantially tessellate with a corresponding triangular protrusion on a corner of the lid of another such conveyor module arranged adjacently. For example, in some arrangements the triangular protrusions on the corners of lids of four such conveyor modules that are adjacently arranged may be configured to substantially tessellate at substantially the centre of the arrangement. The triangular protrusion may help reduce and in some cases prevent relative movement between adjacent conveyor modules. The triangular corners may also help spread the load of the objects being conveyed over the transporting surface.

Preferably, the substantially triangular protrusion comprises a rounded vertex. In this way, the lid may be considered as comprising substantially rounded protrusions rather than pointed protrusions. Advantageously, rounded protrusions may help prevent objects or packaging from becoming caught on the triangular protrusion.

In some examples, the lid comprises an outer perimeter having an inward taper. This may help ensure that objects or packaging do not get caught on the outer edge of the lid. In some cases, an upper and a lower surface of each triangular protrusion are each tapered inwardly.

As before the conveyor module may comprise a casing, wherein the casing may be configured to at least partially house a control mechanism and at least partially house a driving mechanism. The casing may be configured to house a motor. The casing may be external to the housing. A portion (e.g. distal portion) of the control mechanism may extend beyond the casing. The casing may be configured to be releasably attached to the housing. The casing may be configured to be releasably attached to the housing using an interlocking mechanism. As before, the conveyor module may be configured to be releasably mounted within an aperture of a conveying frame, wherein mounting a conveyor module within an aperture establishes an electrical connection between the conveyor module and the conveying frame in order to facilitate electrical communication between the conveying frame and the mounted conveyor module. The advantages of these features are substantially the same as described previously in relation to these features and apply equally to this conveyor module.

According to another aspect there is provided a conveying surface for conveying objects within a conveying system, the conveying surface comprising a plurality of conveyor modules arranged adjacent to each other to define a transport surface over which an object can be conveyed. Each of the plurality of conveyor modules comprises an upper portion, the upper portion comprising at least one corner having a substantially triangular protrusion, the triangular protrusion configured to cooperate with a corresponding triangular protrusion on another of the plurality of conveyor modules. This allows the plurality of conveyor modules to substantially tessellate with each other.

Thus, a triangular protrusion of a first conveyor module may be arranged to substantially tessellate with a corresponding triangular protrusion on the corner of at least a second conveyor module that is adjacently arranged. In another example, the triangular protrusions on the corners of four such conveyor modules that are adjacently arranged may tessellate at substantially the centre of the arrangement.

This design may help prevent relative movement between adjacent conveyor modules which may help to provide a more stable transport surface.

Preferably, the upper portion of each of the plurality of conveyor modules a substantially rectangular outer perimeter. The plurality of conveyor modules may be arranged together in an adjacent configuration in which a side that defines a length of a first rectangular upper portion is arranged adjacent a side that defines a width of a second upper portion; In this way, the arrangement of the plurality of conveyor modules may be such that a conveyor module is rotated (i.e. orientated) substantially 90 degrees compared to its one or more neighbouring conveyor modules. This may help ensure that the conveyor modules are orientated correctly with respect to each when they are arranged adjacently to each other. This may also help prevent relative movement of conveyor modules relative to each other.

As before, the substantially triangular protrusion comprises a rounded vertex. The upper portion, which may be lid, may comprise an outer perimeter having an inward taper. The advantages of these features are substantially the same as described previously in relation to these features and apply equally to this conveying surface.

According to another aspect there is provided a conveyor module for a conveying system for conveying objects, the conveyor module comprising: at least one rotatable element comprising an engagement surface configured to engage with a surface of an object to be conveyed; a driving mechanism configured to rotate the at least one rotatable element such that rotation of the at least one rotatable element causes rotation of the engagement surface and thereby movement of the object, and a control mechanism configured to control rotation of the rotatable element via the driving mechanism; wherein the conveyor module is configured to be releasably mounted within an aperture of a conveying frame; and wherein mounting the conveyor module within an aperture establishes an electrical connection between the control mechanism of the conveyor module and a control system of the conveying frame, which facilitates electrical communication between the conveying frame and the conveyor module.

According to another aspect there is provided a conveying frame for a conveying system for conveying objects, the conveying frame comprising: a plurality of apertures, each aperture configured to receive a conveyor module as described above so as to form an array of conveyor modules that together provide a substantially planar surface for conveying objects thereon; a control system configured to communication with a control mechanism of the conveyor module; wherein each aperture is configured to have a conveyor module releasably mounted within the aperture; and wherein mounting a conveyor module within an aperture establishes an electrical connection between the control mechanism of the conveyor module and the control system of the conveying frame, which facilitates electrical communication between the control system and the conveyor module.

According to another aspect there is provided a planning system for planning the movement of an object. The planning system comprises an information acquisition system configured to obtain object information, wherein the object information comprises a destination location of the object, and a processing system configured to determine a route of the object from the scanning location to the destination location. The planning system also comprises a main control system configured to communicate with a conveying system for conveying objects as described above, wherein the main control system is configured to control the driving mechanism of the conveyor module such that the object is moved across the substantially planar surface along the determined path from the scanning location to the destination location through rotation of the rotatable elements.

The system provides a highly modular and intelligent approach to designing and implementing sorting, storage and transportation solutions for use in e-commerce and logistics related facilities and operations. The system can be used to automate several operations present in warehouses, distribution centers and other similar facilities. The modular design of hardware, combined with intelligent automation software allows for great scalability and easy adaptation of functionality typically not present in traditional e-commerce and logistics automation solutions.

The system provides a modular hardware platform that uses a system of omnidirectional transporting surfaces to move objects freely in any direction while operating efficiently with fewer restrictions on object size. Combined with a smart software system that has full control of the hardware platform the resulting system can be adjusted in use, optimizing for varying demand in functionality, for example throughput of different operations in relationship to one another over time.

The planning system provides a smart, modular sorting, storage and transport system using a flexible omnidirectional transporting surface that allows precise movement of multiple objects across the transporting surface.

Optionally, the planning system comprises an elevator module, configured to raise and lower at least part of a transporting surface. The inclusion of an elevator module allows operation in three dimensions.

BRIEF DESCRIPTION OF DRAWINGS

Embodiments of the present invention will now be described by way of example only with reference to the accompany drawings in which.

DETAILED DESCRIPTION

The present disclosure relates to a conveying system for moving an object around on a surface of the conveying system. In the following description, a package will be used as an example of a type of object that may be moved using the conveying system. Generally, the conveying system comprises a plurality of conveyor modules and a conveying frame. Each conveying module comprises at least one rotatable element having an engagement surface that is configured to engage with a surface of a package. Each conveying module also has a driving mechanism configured to rotate the at least one rotatable element. In this way, rotation of the at least one rotatable element causes rotation of the engagement surface and thereby effects movement of the package on the engagement surface. A control mechanism of the conveying module is configured to control rotation of the rotatable element via the driving mechanism, and communicate with a control system which is generally external to the conveyor module. The conveying frame comprises a plurality of apertures. Each aperture is configured to receive a conveyor module so as to form an array of conveyor modules. Together, the array of conveyor modules provide a substantially planar surface for conveying packages. Each conveyor module is configured to be releasably mounted within an aperture of the conveying frame. By mounting a conveyor module within an aperture, an electrical connection between the conveyor module and the control system is established, thus facilitating electrical communication between the control system and the mounted conveyor module.

In use, a package resting on the engagement surface of the conveyor module is moved across the substantially planar surface created, through rotation of the rotatable elements so that the package is moved from an engagement surface of one conveyor module to an engagement surface of an adjacent conveyor module. This has the effect that the package is moved across the substantially planar surface.

The particular path travelled by the package across the substantially planar surface is determined and controlled by a main communication and control system, which may be referred to as a planning system. This planning system tracks and plans the movement of a package across the substantially planar surface.

Further details of the conveying system and the planning system will now be described.

Figure 1:
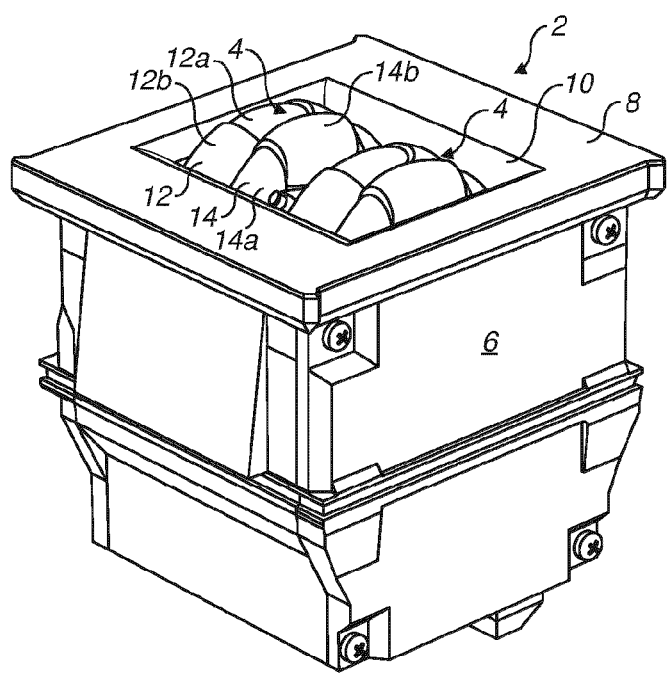
FIG. 1 shows a perspective view of a conveyor module.

Looking first at the conveyor module, FIG. 1 shows an exemplary conveyor module 2. The conveyor module 2 may be referred to as a motorised wheel system (MWS). Generally, the conveyor module 2 is a singular unit that includes rotatable elements in the form of two actuated omnidirectional wheels 4. These wheels 4 allow a force to be applied on a package in one direction while also allowing a package to passively roll over the omnidirectional wheels 4 in the perpendicular direction.

In more detail, the conveyor module 2 includes a housing 6, made up of a number of side plates and having a generally cuboid shape, and a top lid 8. The top lid 8 comprises an aperture 10 through which a portion of each of the omnidirectional wheels 4 protrudes, as shown in FIG. 1.

Each omnidirectional wheel 4 comprises a pair of sub-wheels 12, 14 which cooperate together to act as a single wheel. Each sub-wheel 12, 14 comprises a plurality of fixed segments 12a, 14a and moveable segments 12b, 14b. The plurality of fixed segments 12a, 14a and moveable segments 12b, 14b make up the outer circumference of each sub-wheel 12, 14. In particular, the fixed segments 12a, 14a and moveable segments 12b, 14b are arranged around each sub-wheel 12, 14 such that they are spaced apart from each and so that they alternate with each other. In other words, a fixed segment 12a is circumferentially adjacent (i.e. located between) two moveable segments 12b, and similarly a moveable segment 12b is circumferentially adjacent (i.e. located between) two fixed segments 12a.

The portion of outer circumference of each sub-wheel 12, 14 which protrudes through the aperture 10 in the top lid forms part of an engagement surface. The engagement surface is the part of the conveyor module 2 onto which a package is placed and which causes movement of the package through movement of the omnidirectional wheels 4.

The fixed segments 12a, 14a fixedly rotate with the sub-wheel main body (i.e. they rotate in the direction the sub-wheel 12, 14 is driven by a motor) causing forward and backward motion. During driven motion of the omnidirectional wheel 4, the moveable segments 12b, 14b will also help effect forward and reverse motion of a package on the engagement surface. Additionally, the moveable segments 12b, 14b are able to passively rotate perpendicular to the driven direction causing sideways motion.

The two sub-wheels 12, 14 making up an omnidirectional wheel 4 are offset from each other such that a fixed segment 12a of one sub-wheel 12 is adjacent to a moveable segment 14b of the other sub-wheel 14.

Figure 2:
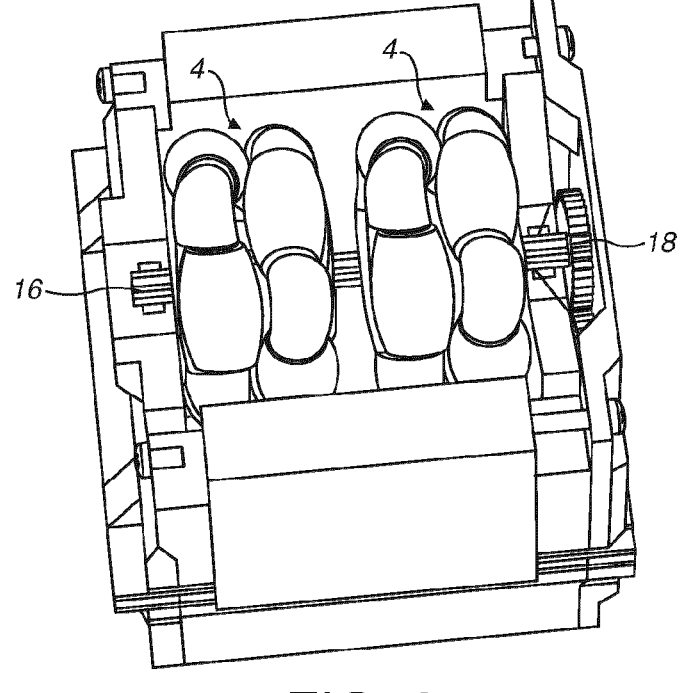
FIG. 2 shows a part-cross sectional view of a conveyor module.
Figure 20:
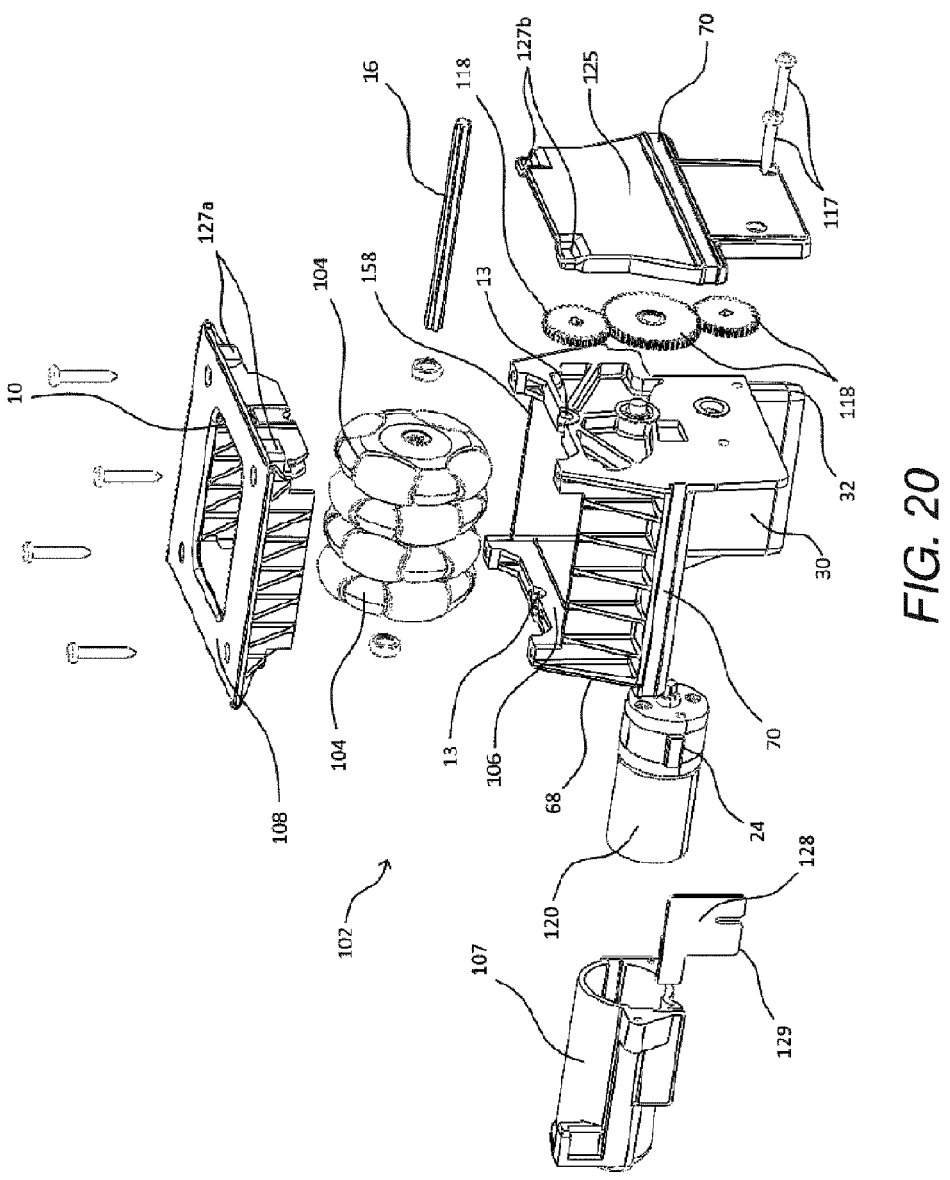
FIG. 20 shows an exploded view of a conveyor module.

As can be seen in FIG. 2, each omnidirectional wheel 4 is mounted onto an axle 16 which is connected to a driving mechanism comprising a plurality of gears 18 and a motor 20. Using the plurality of gears 18, power is transferred from the motor 20 to the axle 16 in order to drive the omnidirectional wheels 4. Bearings are provided for each gear 18 so that they can rotate freely with very little friction, resulting in efficient power transfer from the motor 20 to the omnidirectional wheels 4 as well as reducing wear. The axle 16 is received by a pair of grooves 13 on opposing sides of the housing 6, for example as shown in FIG. 20.

Figure 3:
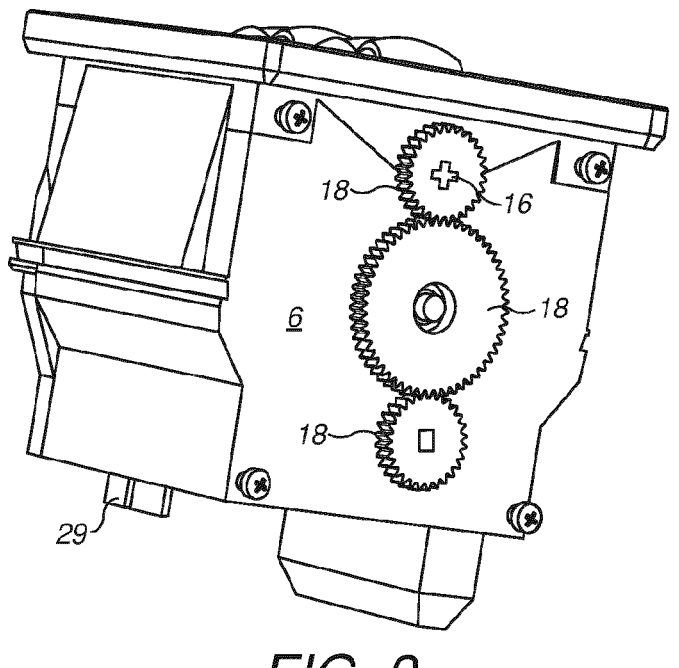
FIG. 3 shows a perspective view of a conveyor module.

In the particular example shown in FIG. 3, the axle 16 has a cross-shaped cross section. The cross-shaped profile of the axle 16 is configured to engage, in an interlocking manner, with a correspondingly shaped hole through the main body of the omnidirectional wheels 4 when the wheels 4 are mounted onto the axle 16. As a result of the interlocking engagement between the axle 16 and the omnidirectional wheels 4, rotation of the axle 16 directly causes rotation of the omnidirectional wheels 4. However, as will be appreciated, any other suitable shape may be used for cross-sectional profile of the axle 16 and the correspondingly shaped hole through the main body of the omnidirectional wheels 4, provided that an interlocking engagement between the axle and the omnidirectional wheels is achieved. For example, both the axle and the hole through the main body of the omnidirectional wheels may have n-pointed star shaped cross sectional profiles, where n is an integer greater than 2.

Figure 4:
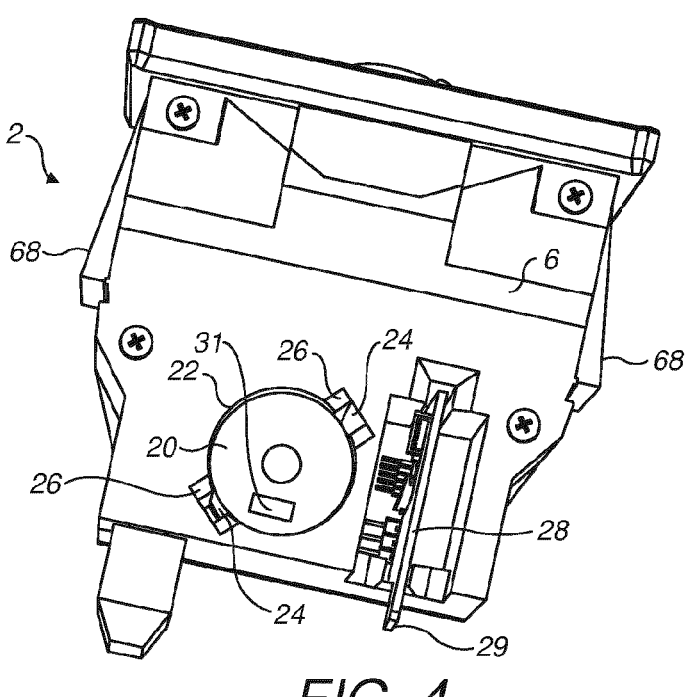
FIG. 4 shows a part cross-sectional view of a conveyor module.

The motor 20, which in this case is a DC motor, can be seen in FIG. 4. The motor 20 is contained within a channel 22 of the conveyor module housing 6. In order to prevent the motor 20 from freely rotating within this channel 22, the motor 20 comprises a pair of protrusions 24 extending radially away from the main body of the motor 20. The protrusions 24 are spaced substantially opposite each other around the circumference of the motor 20. That is, the protrusions 24 are located approximately 180 degrees from each other. The protrusions 24 are arranged to engage with a pair of correspondingly shaped slots 26 within the channel 22, in order to retain the motor 20 in place. As a result of this engagement, the motor 20 cannot rotate freely about its centre point.

Although not shown in FIGS. 3 and 4, back and side plates are provided to cover the gears 18 and the motor 20 to protect the parts of the driving mechanism from dust and damage due to external factors. In addition, the back plate helps prevent sideways movement of the motor 20 along the channel in the housing 6, and so the back plate prevents the motor 20 from falling out of the channel 22 in the housing 6.

The conveyor module 2 comprises a control mechanism 28 which takes the form of a printed circuit board (PCB), as shown in FIG. 4. The control mechanism 28 is connected to the motor 20 via a connection point 31 on the motor which provides an electrical interface between the motor 20 and the control mechanism 28. The control mechanism 28 controls the rotation of the omnidirectional wheels 4 via the motor 20 and gears 18.

The control mechanism 28 is also arranged to communicate with a control system that is external to the conveyor module 2, typically part of the conveying frame. In this way, the control mechanism 28 can receive commands from the control system and control the motor 20 accordingly. This will be explained in more detail later.

Figure 5:
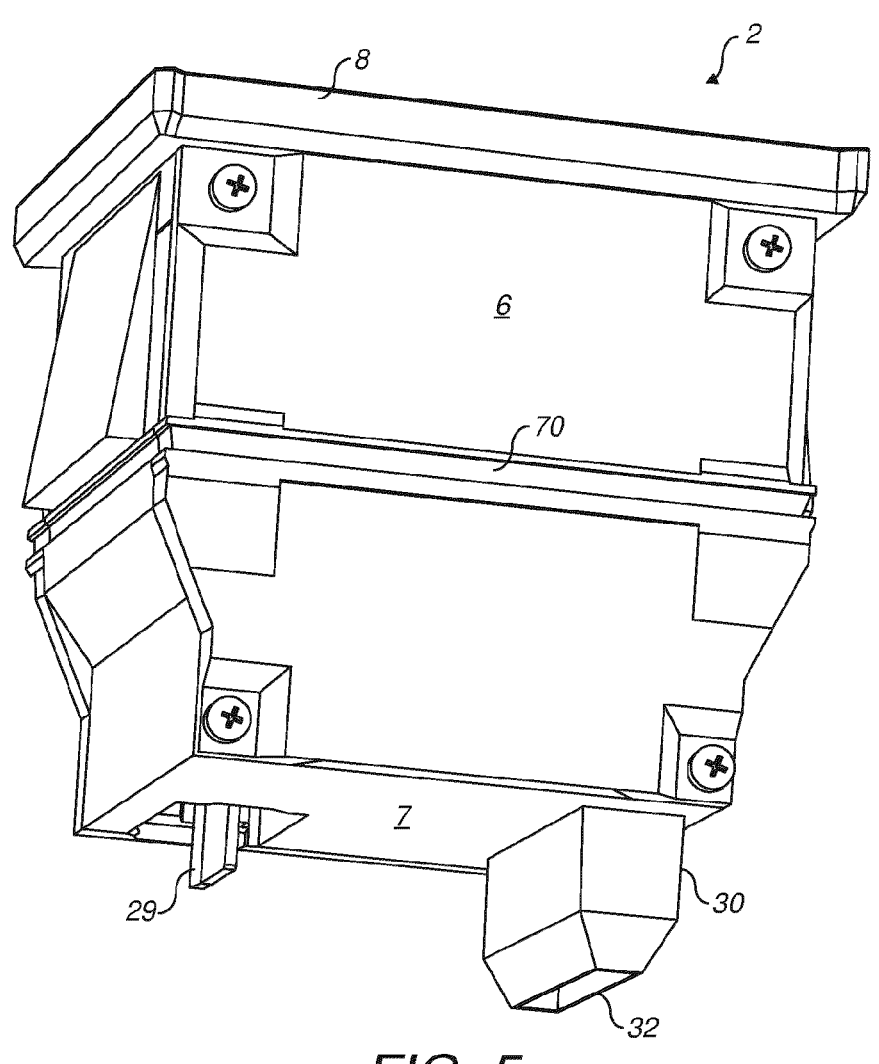
FIG. 5 shows a perspective view of a conveyor module.

As illustrated in FIG. 5, the housing 6 of the conveyor module 2 comprises a chute 30 projecting away from the main body of the conveyor module 2 from the bottom 7 of the housing 6. Here, the bottom 7 of the housing 6 corresponds to the part of the housing 6 opposite the top lid 8. Details of the chute 30 can be more clearly seen in FIGS. 6 and 7.

The chute 30 comprises a passageway 34 which extends into the main body of the conveyor module 2 to a chamber 36 in which the omnidirectional wheels 4 are located to allow them to rotate freely. The chamber 36 fluidly connects with the aperture 10 in the top lid 8 of the conveyor module 2. The chute 30 acts as a water and dust drainage system, allowing dust and water which enters the aperture 10 to flow through the chamber 36 and passageway 34, and out of the chute 30 via an opening 32. In use, the passageway 34 of the conveyor module 2 will be substantially vertical. This has the advantage that any debris collected in the chamber 36 is able to flow downwards through the passageway 34, under the action of gravity, and out the opening 32 in the chute 30. This avoids debris, in particular water and dust, building up within the chamber 36, or space, which surrounds the omnidirectional wheels 4 which could affect rotational movement of the wheels 4. The conveyor module 2 can therefore be thought of as comprising a through passageway which extends between a first opening at the top of the conveyor module 2 (i.e. the aperture 10 in the top lid 8) and a second opening at the base of the conveyor module (i.e. the opening 32 of the chute 30). The omnidirectional wheels 4 are located at least partially within this through passageway.

Figure 8:
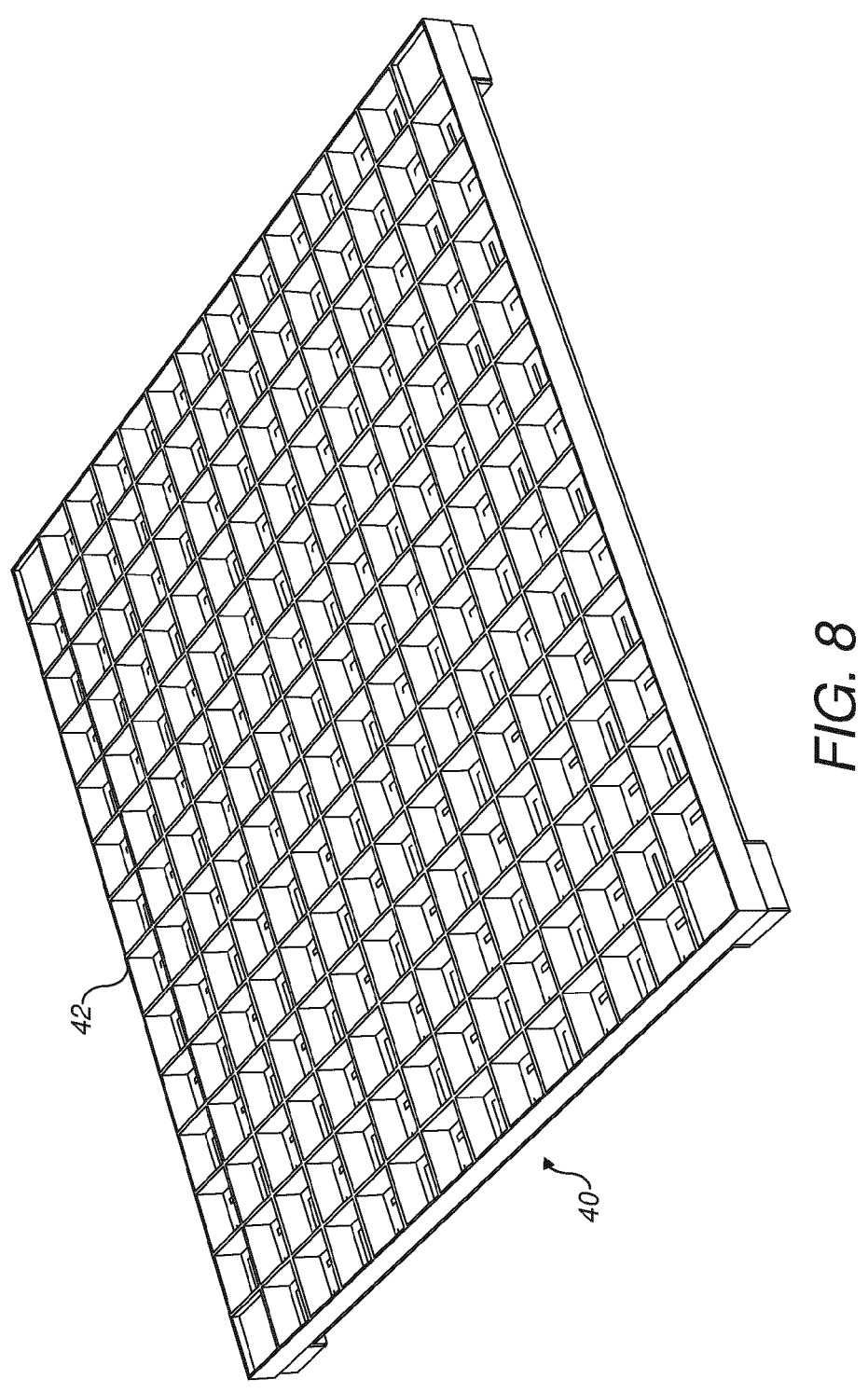
FIG. 8 shows a perspective view of a conveying frame.
Figure 14:
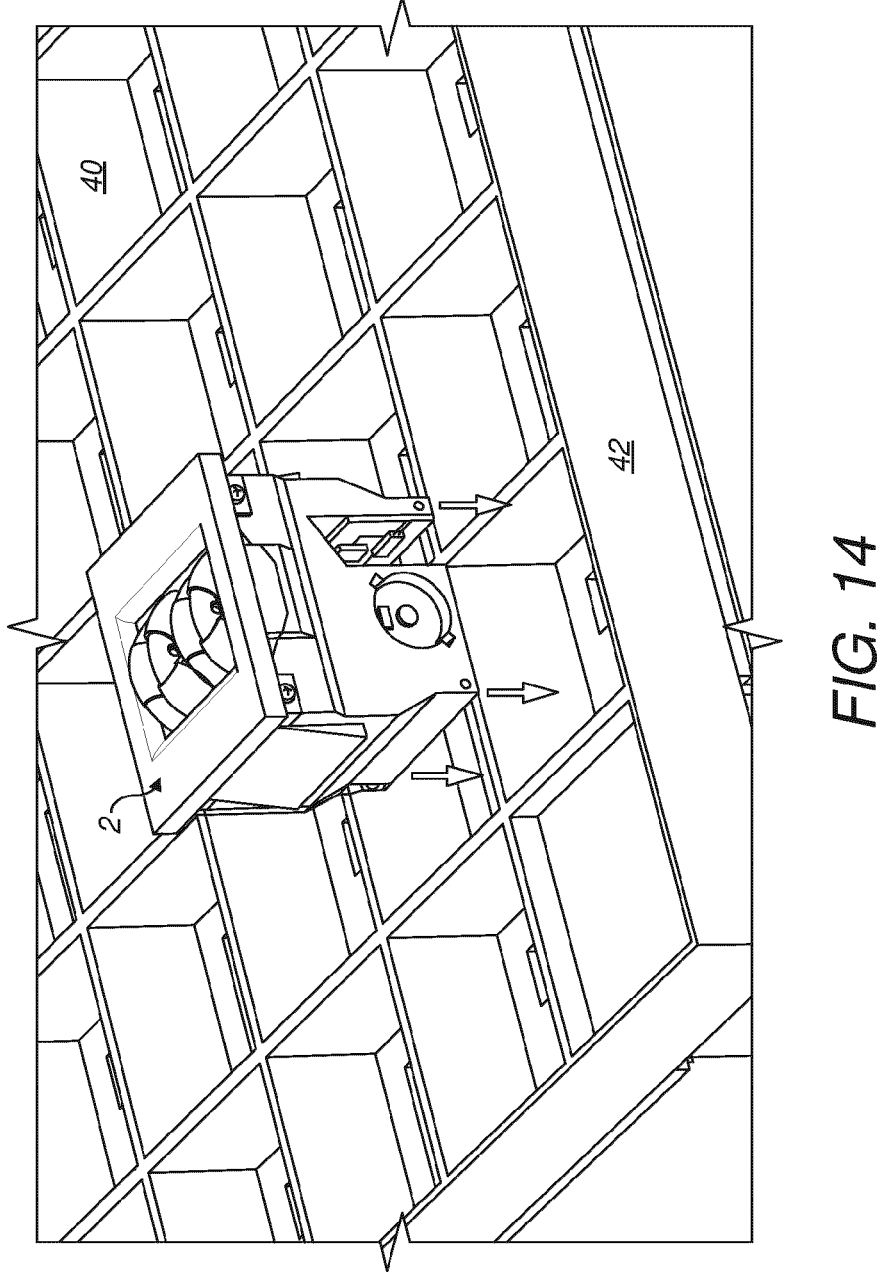
FIG. 14 shows a perspective view of a conveying frame and conveyor module.

Turning now to FIG. 8, an exemplary conveying frame 40 is shown in the form of a metal grid frame. The conveying frame 40 comprises a plurality of apertures 42, regularly arranged in a grid-like manner across the conveying frame 40. The apertures 42 of the conveying frame 40 are each for receiving a conveyor module 2 as illustrated in FIG. 14, forming an array of conveyor modules 2 that together form a conveying surface for transporting packages received on this surface. The conveying frame 40 therefore acts as a support structure for holding many conveying modules 2 together in order to form a transport surface over which packages can be transported.

Figure 9:
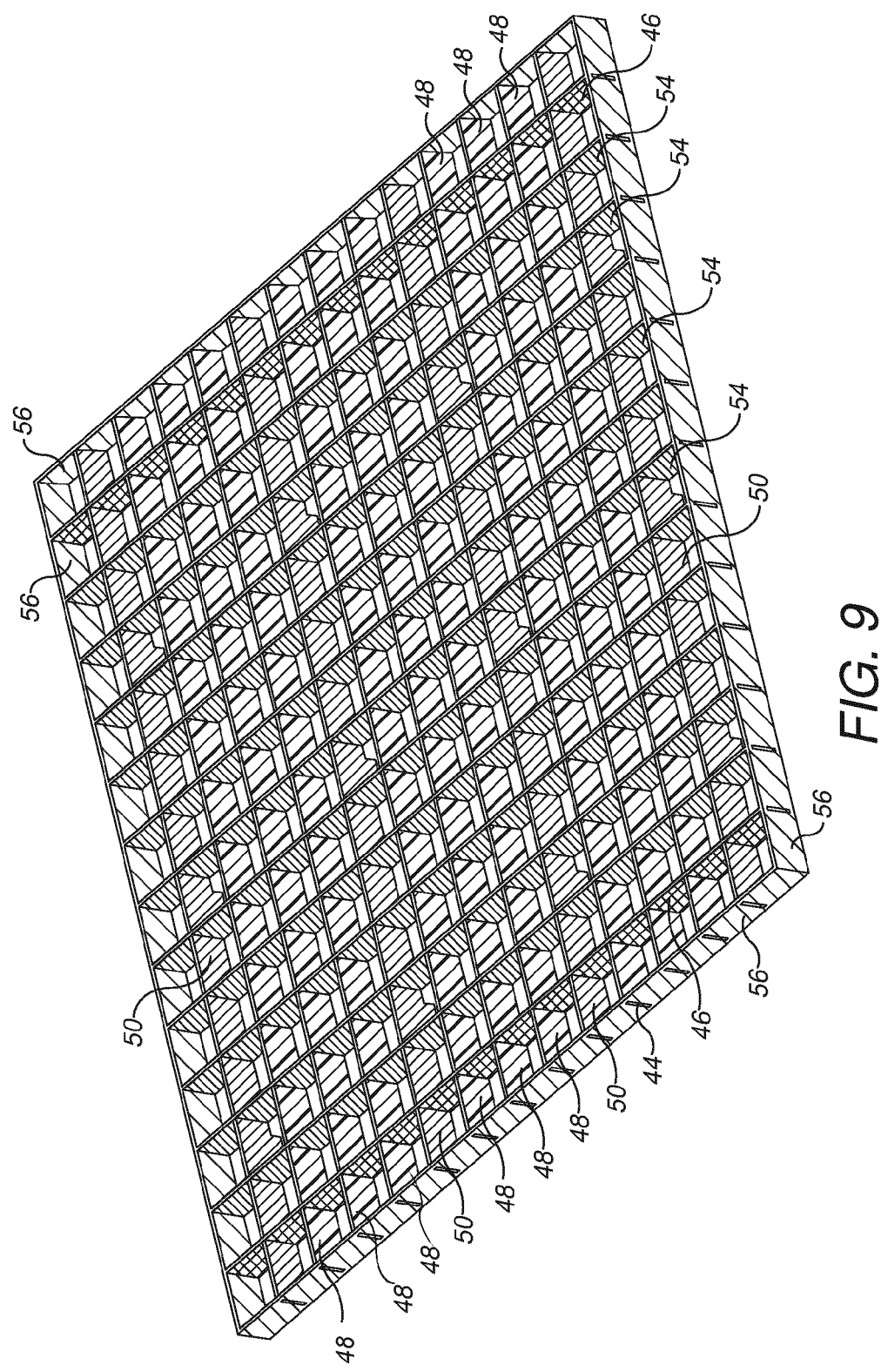
FIG. 9 shows a perspective view of part of a conveying frame.
Figure 10:
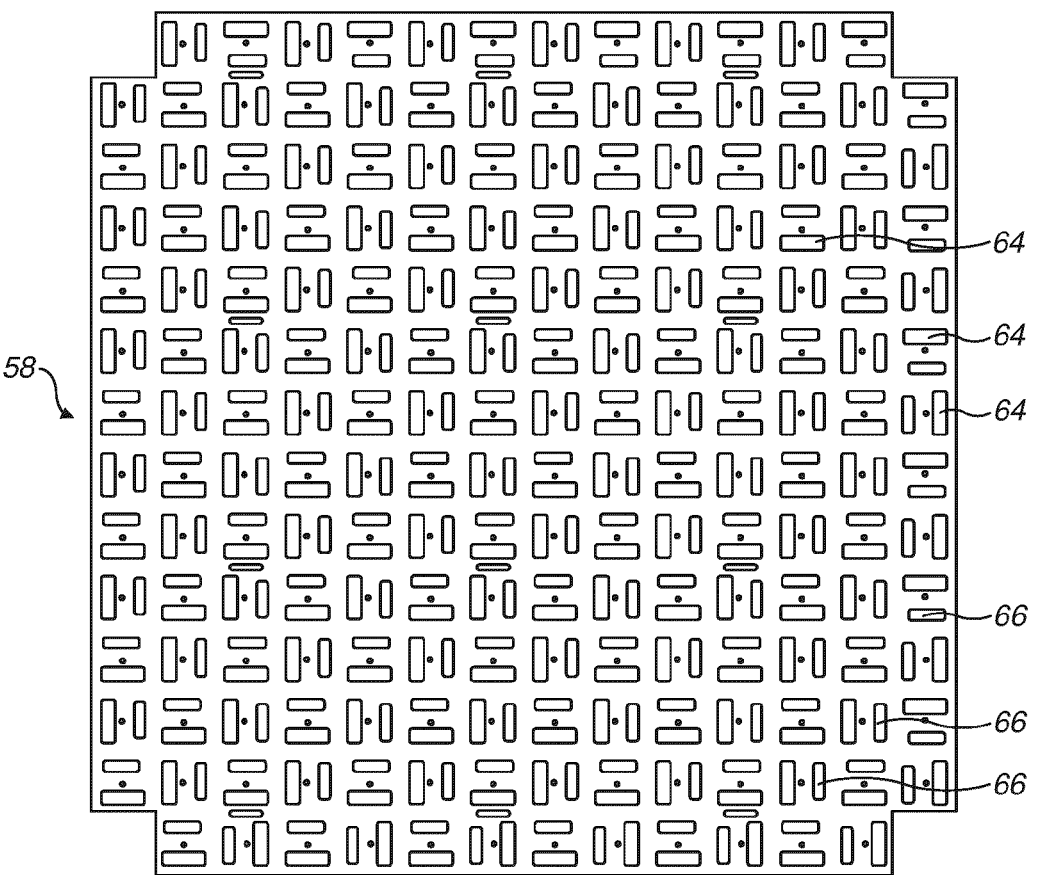
FIG. 10 shows a top down view of part of a conveying frame.

The conveying frame 40 comprises a framework 44, shown in FIG. 9, and a baseplate 58, shown in FIG. 10.

The framework 44 comprises two support plates 46, positioned substantially parallel to each other and spaced apart from each other. The support plates 46 are located adjacent and parallel to two side edges of the framework 44, as shown in FIG. 9. The support plates 46 are made of stainless steel in order that these support plates 46 are sufficiently strong to be able to withstand the weight of the conveying system.

The framework also comprises a plurality of primary inner plates 48, positioned substantially parallel to each other and spaced apart from each other. The primary inner plates 48 are generally perpendicular to the support plates 46, and extend across the middle area of the framework, as shown in FIG. 9. The support plates 46 may be made of aluminium.

Figure 12:
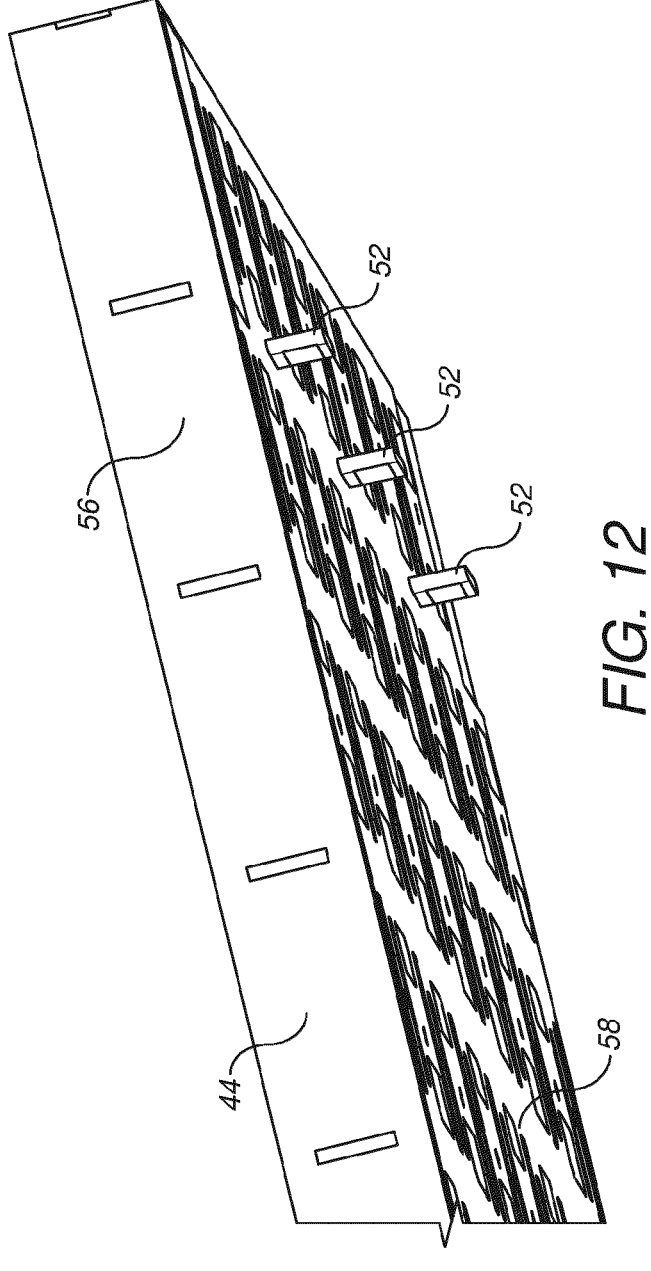
FIG. 12 shows a perspective view of part of a conveying frame.

A plurality of connector plates 50 are positioned substantially parallel to each other and spaced apart from each other, acting to separate the plurality of inner plates 48 into a number of sub-groups, as shown in FIG. 9. The connector plates 50 are parallel to the inner plates 48 and perpendicular to the support plates 46. The connector plates 50 may be made of aluminium. Each connector plate 50 comprises a plurality of connector legs 52, extending away from the framework 44 underneath the framework 44, as shown in FIG. 12.

In order to complete the grid-like framework 44, a plurality of secondary inner plates 54 are positioned substantially parallel to the support plates 46, extending across the inner area of the framework 44. The secondary inner plates 54 are perpendicular to the primary inner plates 48 and the connector plates 50. The secondary inner plates 54 may be made of aluminium.

Finally, four edging plates 56 are placed around the outer edge of the framework 44 forming the outer boundary of the framework 44, as shown in FIG. 9. The edging plates 56 may be made of aluminium.

All the plates of the framework are connected together using a plurality of slots within each plate. Thus, one plate is slotted into another plate forming an intersection. In particular, the plates are arranged to slot into each other under the action of gravity, and so the framework 44 can be held together under the action of gravity rather than physical fixing components. In the example shown in FIG. 9, the constructed framework 44 forms a grid having 14×14 apertures 42, where each aperture 42 is a square of size 83 mm×83 mm. However, alternative framework sizes are also possible.

Figure 11:
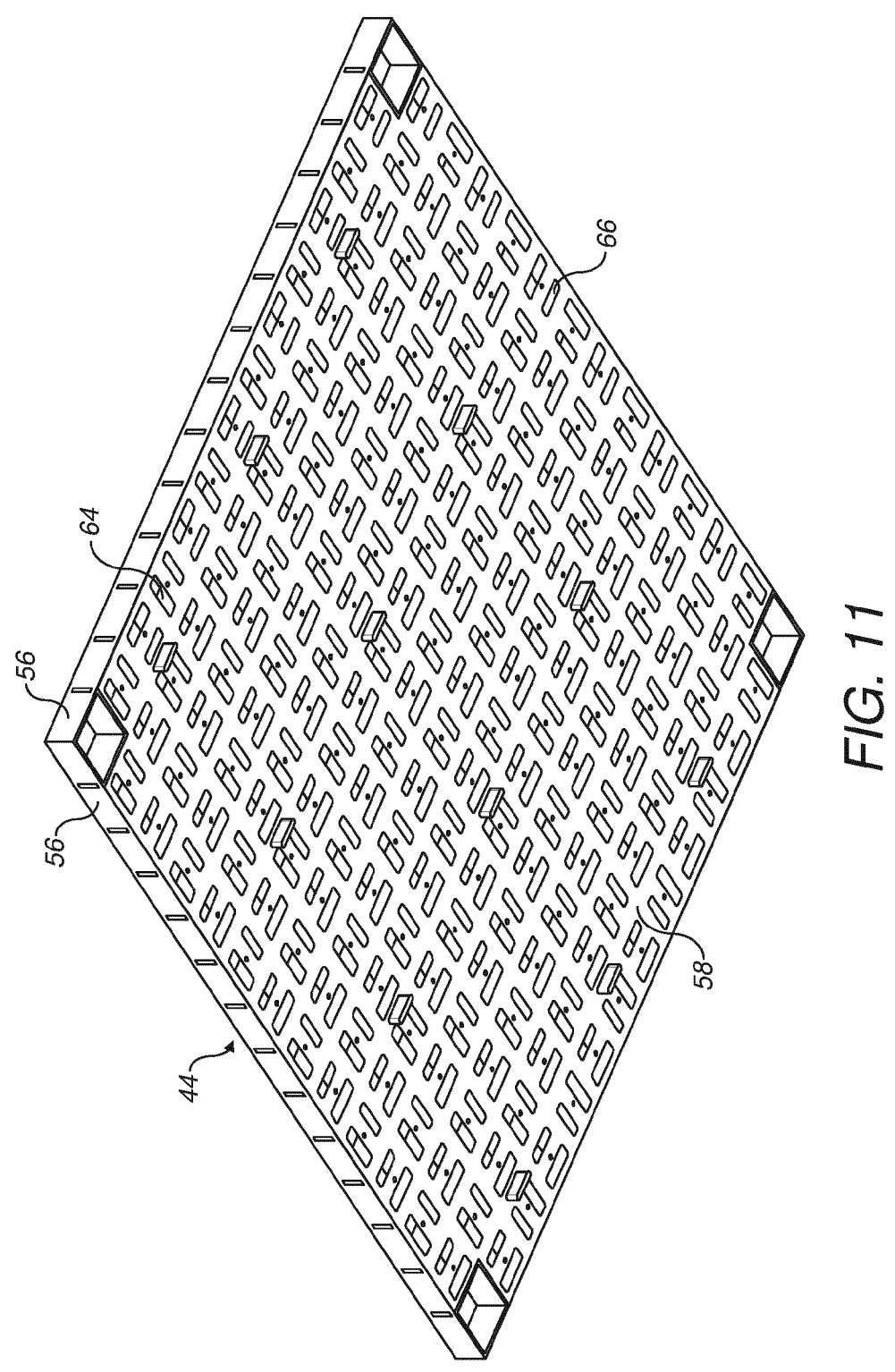
FIG. 11 shows a perspective view of a conveying frame.

Once the framework 44 has been constructed, the baseplate 58 is attached to the underside of the framework 44, as shown in FIG. 11. When the baseplate 58 is attached to the framework 44, the connector legs 52 extend through corresponding slots in the baseplate 58 as shown in FIG. 12. In order to improve the structural integrity of the conveying frame 40, the baseplate 58 can be welded to the framework 44, for example using point welding.

Figure 13:
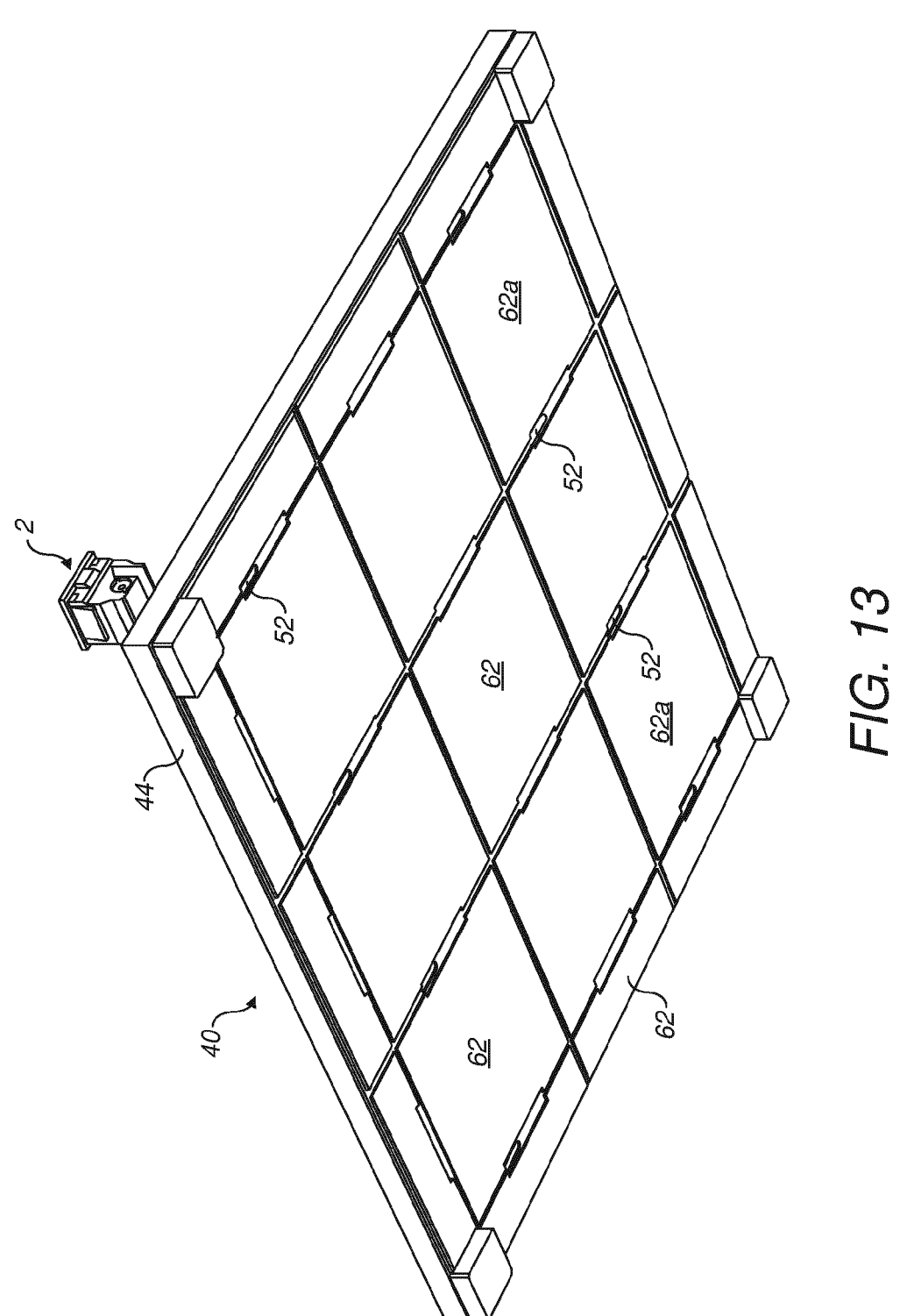
FIG. 13 shows a perspective view of a conveying frame and conveyor module.

A control system 60 is arranged to communication with a main control system as well as each conveyor module 2. The control system 60 forms part of the conveying frame 40 and takes the form of a PCB system comprising a plurality of PCBs 62, as shown in FIG. 13. The PCBs 62, which may also be referred to as Mod-PCBs (module PCBs), come in two general forms. A first form may be referred to as a large PCB 62a, and comprises a PCB having an area sized to cover 4×4 apertures 42 in the conveying frame 40. A second form may be referred to as a small PCB 62b, and comprises a PCB having an area sized to cover 1×4 apertures 42 in the conveying frame 40. The different forms are required due to the shape of the baseplate 58, which can be seen more clearly in FIG. 10. Although the baseplate 58 is generally square in shape, there is a void or empty space at each corner of the baseplate 58. As such, the large PCBs 62a are used to cover a main square area of the baseplate 58 while the small PCBs 62*b* are used to cover each of the four shorter outer edge areas of the baseplate 58, as shown in FIG. 13. Thus, the two different PCB forms perform the same function. However, their different structure ensures the baseplate 58 is fully covered by the control system 60. This arrangement of PCBs 62 is an efficient way of covering the whole are of the baseplate 58 whilst using as few different forms and as few individual PCBs as possible. The multiple PCBs 62 are connected together using wires. In the illustrated example, the wires are threaded through the connector legs 52, which are in the form of a ring, in order to ensure the wires are kept tidy and out of the way. However, in other examples not illustrated, the wires may be arranged in another way, for example the wires may be placed in channels.

The control system 60 is connected to a main power supply located underneath the conveying frame 40. In particular, each PCB 62 comprises a power inlet connected to a power supply unit (PSU). Thus, there is one PSU for each conveying frame 40.

As mentioned previously, each conveyor module 2 is designed to be inserted into an aperture 42 in the conveying frame 40, as shown in FIG. 14, in order to form a transporting surface made up of multiple conveyor modules 2. Since each conveyor module 2 is identical, forming the transporting surface using multiple, identical conveyor modules 2 reduces overall production costs. In addition, since all the omnidirectional wheels 4 within each conveyor module 2 are pointing in the same direction, and each conveyor module 2 has only one motor 20 to drive the wheels 4, each conveyor module 2 is relatively cheap to produce.

In particular, the conveyor module 2 is designed to be easily inserted into an aperture and removed from the aperture 42. In other words, there are no fixed or permanent connections between the conveyor module 2 and the conveying frame 40. Instead the conveyor module 2 can be inserted into an aperture 42 when it is need and subsequently removed from the aperture 42 either when it is not needed or for replacement or repair. In this way, the conveyor module 2 can be thought of as being releasably mounted within the aperture 42 rather than fixedly mounted within the aperture 42. The ability to insert and remove the conveyor module 2 as and when needed may be referred to as "Plug-and-Play".

The conveyor module 2 is designed such that when the conveyor module 2 is inserted into an aperture 42 of the conveying frame 40, the control mechanism 28 of the conveyor module 2 will automatically connect with the control system 60, in particular the PCB 62, of the conveying frame 40. This therefore has the effect that when the conveyor module 2 is inserted into an aperture 42 of the conveying frame 40, the control mechanism 28 of the conveyor module 2 will automatically connect with the main control system, via the connection with the control system 60 of the conveying frame 40.

Automatically establishing an electrical connection between the conveying module 2 and the conveying frame 40 upon insertion of the conveyor module 2 into the conveying frame 40 means that an electrical connection is automatically established between the conveying module 2 and the main control system upon insertion of the conveyor module 2 into the conveying frame 40.

Each PCB 62 on the underside of the conveying frame 40 is connected to a plurality of conveyor modules 2 above the PCB 62 as well as being connected to the main power supply and control systems below the PCB 62. In this way, each conveyor module 2 is connected to the main power supply and control system via the PCBs 62 of the conveying frame 40.

Due to the design of the conveyor module 2, and the provision of a large PCB 62 for connection and power supply on the underside of the conveying frame 40, each conveyor module 2 can be simply "dropped" into an aperture 42 of the conveying frame 40 and the conveyor module 2 will connect its own control mechanism, in the form of a PCB, to the central control system. This "plug and play" mounting system makes it possible to change a conveyor module 2 very quickly should the existing one malfunction, thus decreasing the cost of maintenance.

A number of features which facilitate the plug-and-play solution will now be discussed.

As can be seen in any of at least FIGS. 3-7, the control mechanism 28 comprises a portion 29 which extends beyond the housing 6 of the conveyor module 2. The chute 30 also extends beyond the main housing 6 of the conveyor module 2.

Figure 14A:
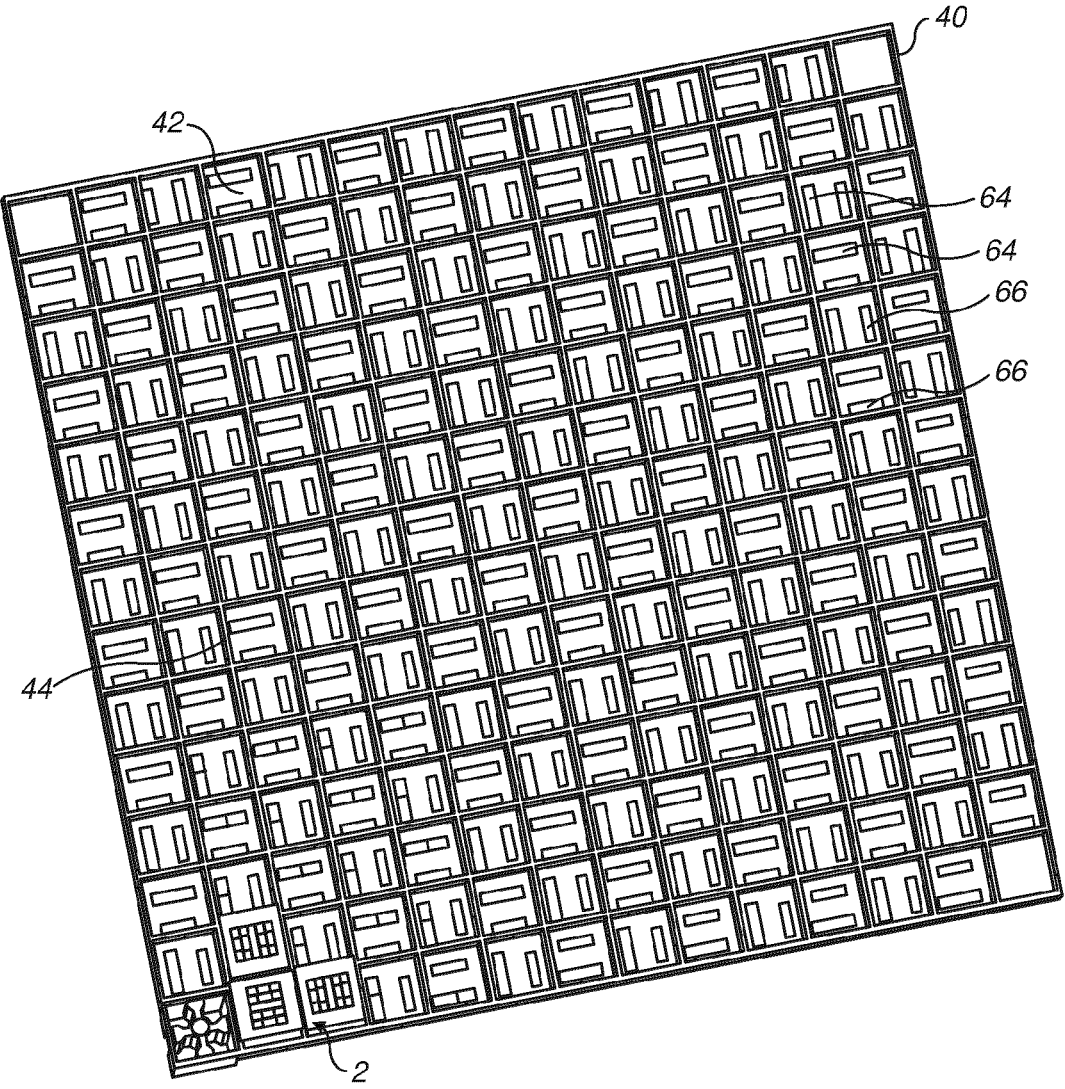
FIG. 14a shows a top down view of a conveying frame and conveyor modules.

As can be seen in FIG. 14*a* each aperture 42 comprises two slots, namely a primary slot 64 and a secondary slot 66. Both the primary and secondary slots 64, 66 are substantially rectangular in shape. Generally, the primary slot 64 is larger than the secondary slot 66. The primary and secondary slots 64, 66 in each aperture correspond to the slots 64, 66 in the baseplate 58 as shown in FIG. 10.

Figure 14B:
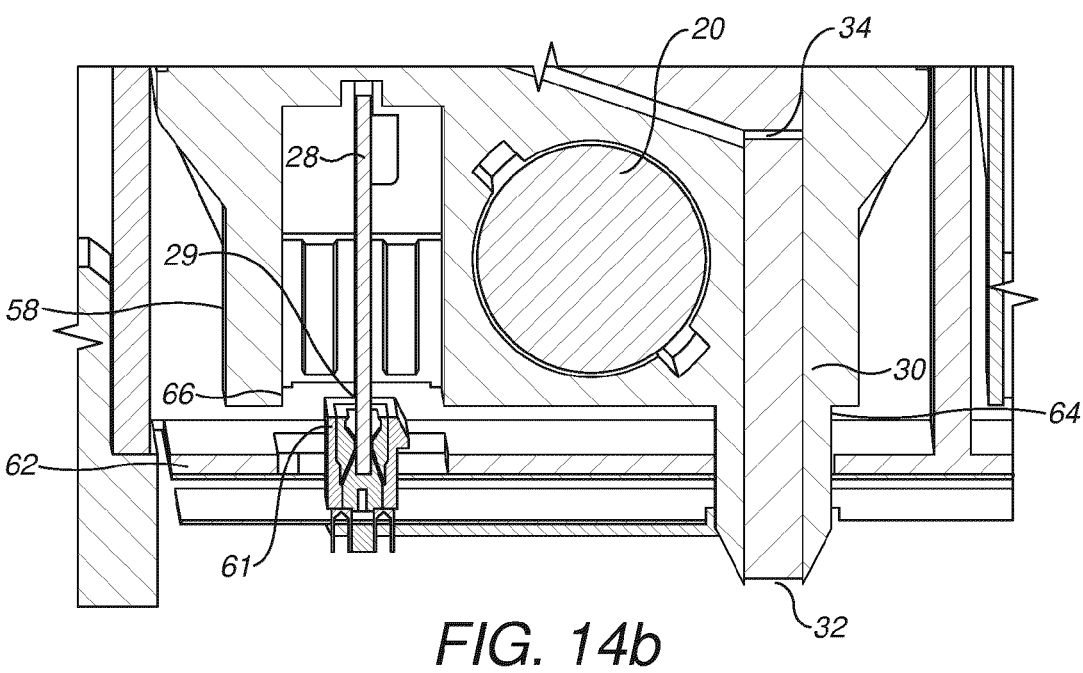
FIG. 14b shows a cross-sectional view of a conveying frame and conveyor module.
Figure 14C:
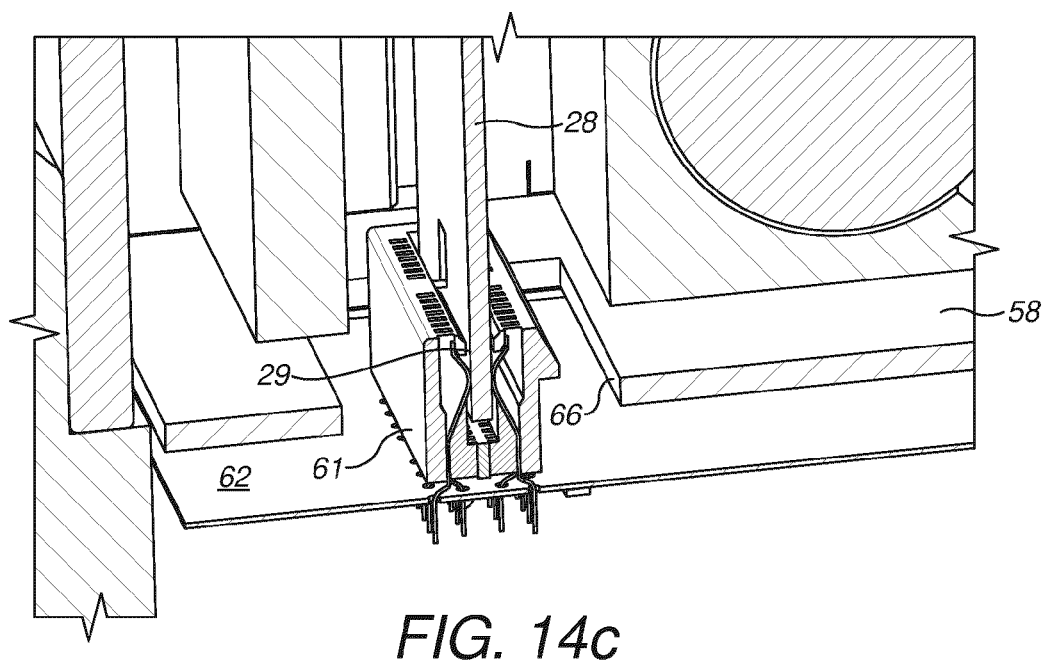
FIG. 14c shows a cross-sectional view of a conveying frame and conveyor module.

When the conveyor module 2 is inserted into the aperture 42, the extending portion 29 of the control mechanism 28 is arranged to be inserted into the secondary slot 66 in the baseplate 58, as can be seen in FIG. 14*c*. In particular, each extending portion 29 of the control mechanism 28 of the conveyor module 2 is received by a PCI connection interface 61 on the PCB 62 of the conveying frame 40. The extending portion 29 slots into the female PCI connector 61 which extends upwards from the PCB 62 mounted below the baseplate 58 and extends towards the conveyor module 2. When the conveyor module 2 is inserted into the aperture 42, the extending portion 29 slides into the PCI connector 61 on the PCB 62, thus connecting the control mechanism 28 of the conveyor module 2 to the control system 60 of the conveying frame 40.

The use of a control mechanism 28 in the form of a PCB on the conveyor module 2 and a corresponding PCB 62 and PCI 61 connection on the conveying frame 40 provides the ability to control and power each conveyor module 2 independently from each other. The use of PCBs rather than a wire-based system results in a more compact system and a quicker assembly process. Furthermore, maintenance of both the conveyor module 2 and the conveying frame 40 is much simpler because the conveyor module 2 can be simply lifted out of its corresponding aperture 42 in the conveying frame 40, without the need to undo lots of wiring.

In addition, when the conveyor module 2 is inserted into the aperture 42, the chute 30 is arranged to be inserted into the primary slot 64 in the baseplate 58 as can be seen in FIG. 14*b*. This is important because the chute 30, which extends through the baseplate 58, acts to anchor the conveyor module 2 into the aperture 42 of the conveying frame 40. In particular, the chute 30 helps to correctly align the conveyor module 2 within the aperture 42 which helps ensure correct alignment of the extending portion 29 with the PCI connection 61 on the PCB 62. In particular, as the chute 30 extends further away from the housing 6 than the extending portion 29, when the conveyor module 2 is inserted into the aperture 42, the chute 30 is inserted into the primary slot 64 in the baseplate first to ensure correct alignment. As the conveyor module 2 is further inserted into the aperture 42, the extending portion 29 then connects with the PCB 62 of the conveying frame 40.

By having the chute 30 inserted into the baseplate 58 before the extending portion 29, correct positioning of the conveyor module 2 within the aperture 42 is achieved before the electrical connection with the conveying frame 40 and main control system is made. This reduces the chance of damaging electrical components during insertion of the conveyor module 2, as well as ensure a good electrical connection is made. The primary slot 64 in the baseplate may therefore be thought of as an alignment slot 64 and the secondary slot 66 may be thought of as a connection slot 66.

As can be seen in FIG. 14b, the chute 30 also extends through a corresponding slot in the PCB 62, and so the opening 32 passes through the PCB 62. This is necessary because the function of the chute 30 is to allow dust and water to drain from inside the housing 6 of the conveyor module 2 to the outside. The chute 30 must therefore extend through the PCB 62 to ensure that the exhausted dust and water are not deposited on the PCB and do not come into contact with any of the electrical components. This is important because any water than may come into contact with the electrical components may cause short circuits, which may damage the components, and is a potential fire hazard.

To further facilitate correct placement of the conveyor module 2 within the aperture 42, the housing 6 of the conveyor module 2 is provided with a pair of flanges 68, for example as shown in FIG. 4. The flanges 68 are located substantially opposite each other on opposite sides of the housing 2. Each flange 68 extends along the length of the side of the housing 6. When the conveyor module 2 is inserted into the aperture 42, the flanges 68 abut the framework 44, preventing the conveyor module 2 from being further inserted into the aperture 42. In particular, each flange 68 rests on a top surface of a plate 46, 48, 50, 54, 56 of the framework 44. This helps ensures that the extending portion 29 of the control mechanism 28 is correctly inserted into the PCI connection 61 of the control system 60, ensuring a good electrical connection. The flanges 68 may also support the housing 6 within the framework 44, and so the flanges 68 may be considered as support members. The flanges act to support the weight of the conveyor module 2 on the framework 44.

Figure 6:
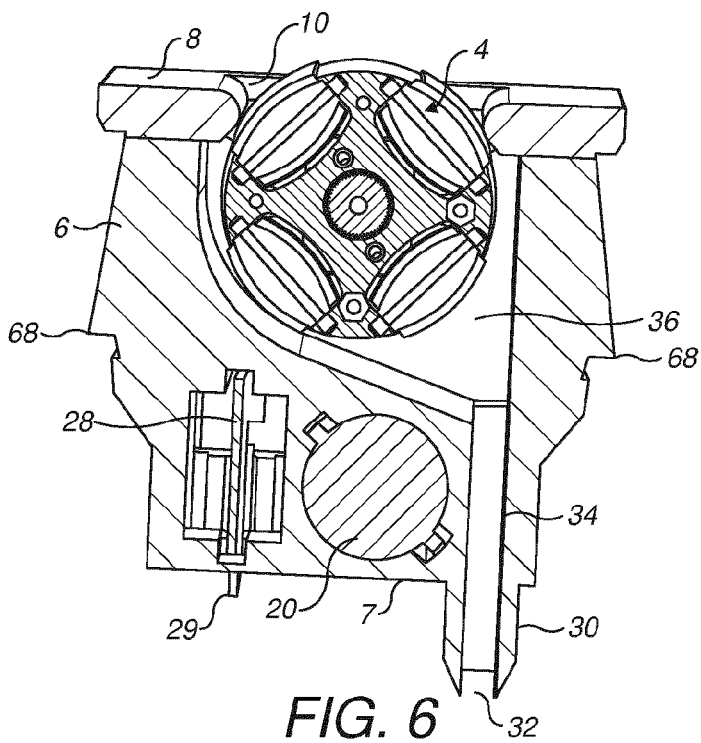
FIG. 6 shows a cross-sectional view of a conveyor module.
Figure 7:
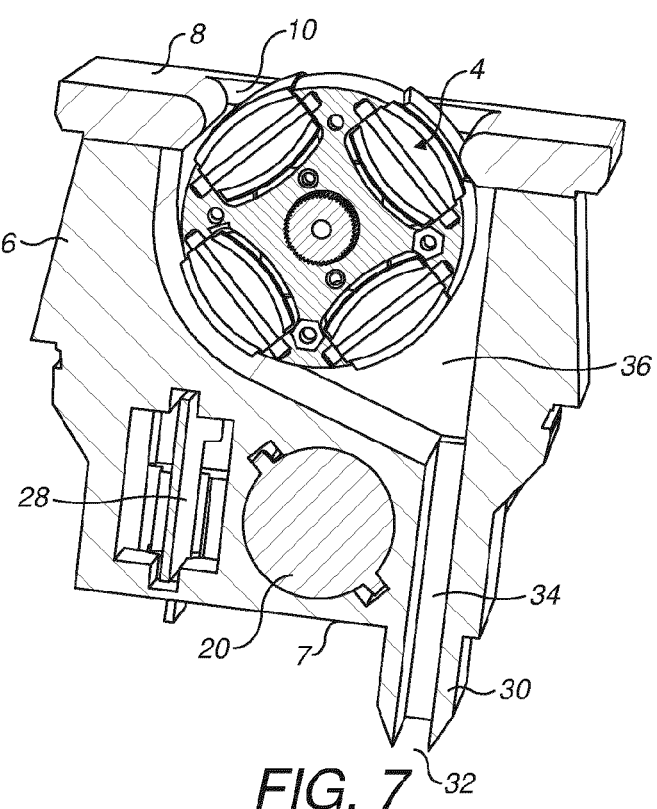
FIG. 7 shows a cross-sectional view of a conveyor module.

As discussed, the flanges 68 are generally only located on two opposing sides of the housing 6, rather than on all four sides. The housing 6 has a generally square shape. However, the top lid 8 has a generally rectangular shape. The pair of flanges are arranged on the sides of the housing 6 corresponding to the shorter sides of the top lid 8. In particular, the top lid 8 is arranged to extend over the flanges 68, as shown in FIG. 6. Having a top lid 8 which extends over the flanges 68, reduces the chance of neighbouring conveyor modules 2 from getting caught on each other during insertion or removal from an aperture 42.

The conveyor module also comprises a track 70 which extends around the perimeter of the housing 6, which can partially be seen in FIG. 5. The track 70 is located below the flanges 68. The track 70 is shaped to receive a length of elastically deformable material. The material is also flexible so that it can follow the shape of the track 70. Examples of suitable materials include foam or rubber. The material is inserted into the track 70, along the entire length of the track 70, and acts to provide a tight fit between the housing of the conveyor module 2 and the plates of the framework 44 when the conveyor module 2 has been positioned within the aperture 42. The material fills in any space between the housing 6 and the plates, preventing lateral movement of the conveyor module 2 in the aperture 42. Preventing unwanted lateral movement is important for ensuring a stable electrical connection and preventing damage of components.

Figure 18:
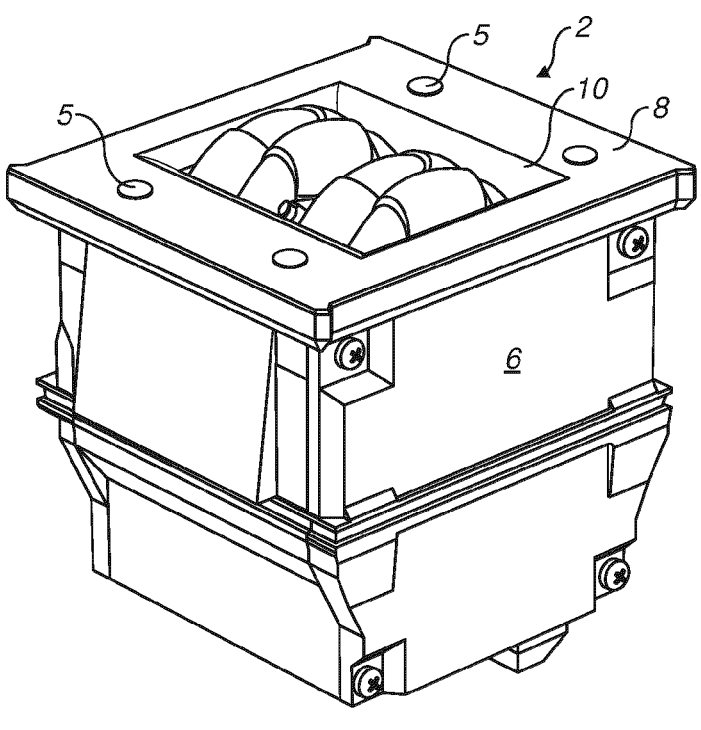
FIG. 18 shows a perspective view of a conveyor module.

To facilitate removal of the conveyor module 2 from the conveying frame 40, some conveyor modules 2 include at least one magnetic portion 5 as shown in FIG. 18. The magnetic portion 5 allows a removal device comprising an electromagnet to remove the conveyor module 2 from the conveying frame 40 through interaction between the electromagnet and the at least one magnetic portion 5 on the conveyor module 2. In the example illustrated in FIG. 18, the magnetic portion 5 is located within the top lid 8 of the housing 6 of the conveyor module 2, such that the magnetic portion 5 can be considered as located on an upper external surface of the conveyor module 2, so that the magnetic portion 5 is easily accessible by the electromagnet which facilitates handling of the conveyor module 2 by the electromagnet, in particular insertion and removal of the conveyor module 2 from the conveying frame 40.

As can be seen in FIG. 18, the conveyor module 2 comprises a plurality of magnetic portions 5, in this case four magnetic portions 5. In this example, the magnetic portions 5 are located on either side of the aperture 10 of the top lid 8. Multiple magnetic contact points 5 between the conveyor module 2 and the electromagnet of the removal device facilitates stable removal of the conveyor module 2 from the conveying frame 40.

The one or more magnetic portions 5 takes the form of a metal plate located within in the top lid 8, for example within a recess in the top lid 8.

Figure 15:
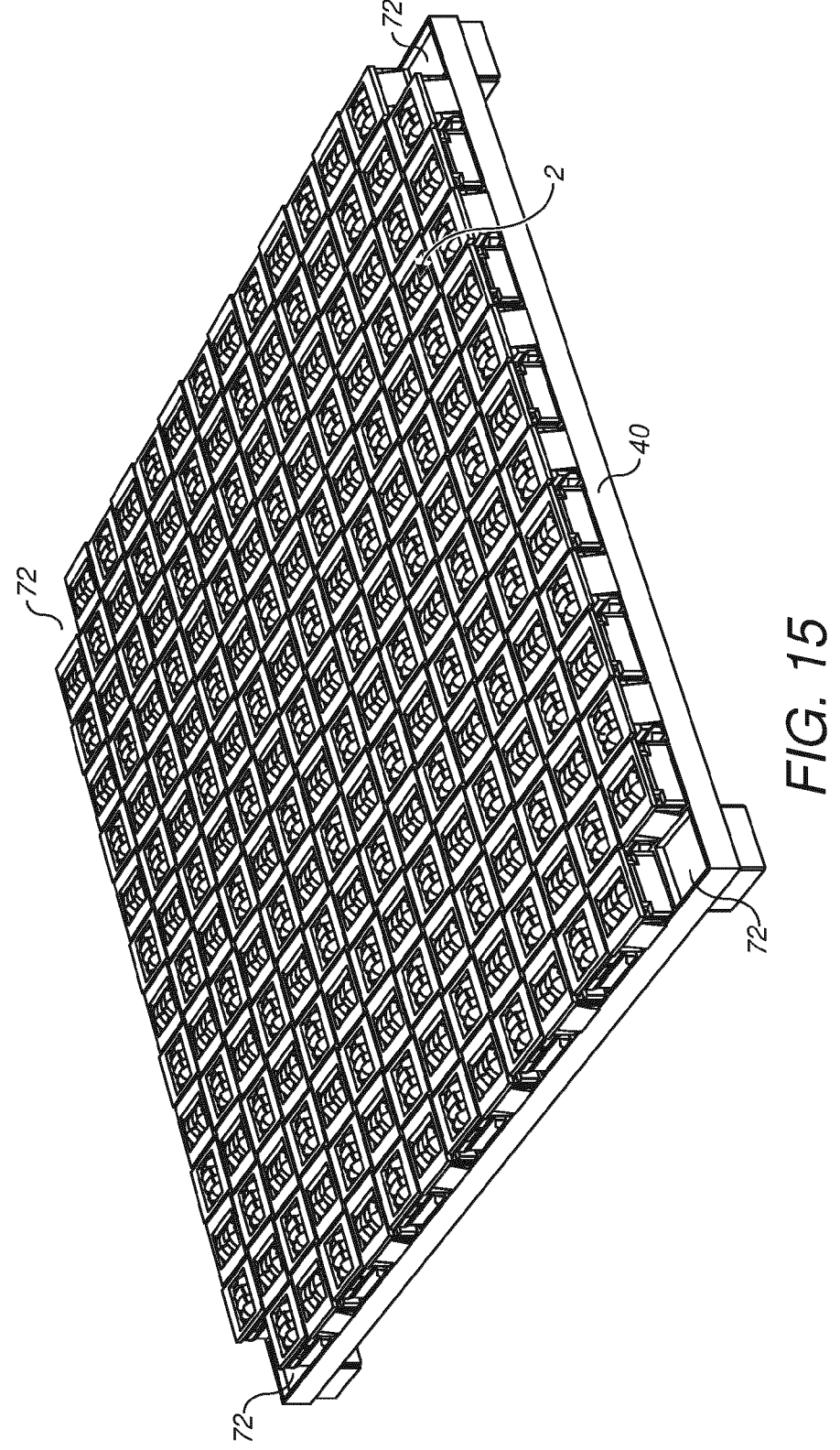
FIG. 15 shows a perspective view of a conveying frame and conveyor modules.
Figure 16:
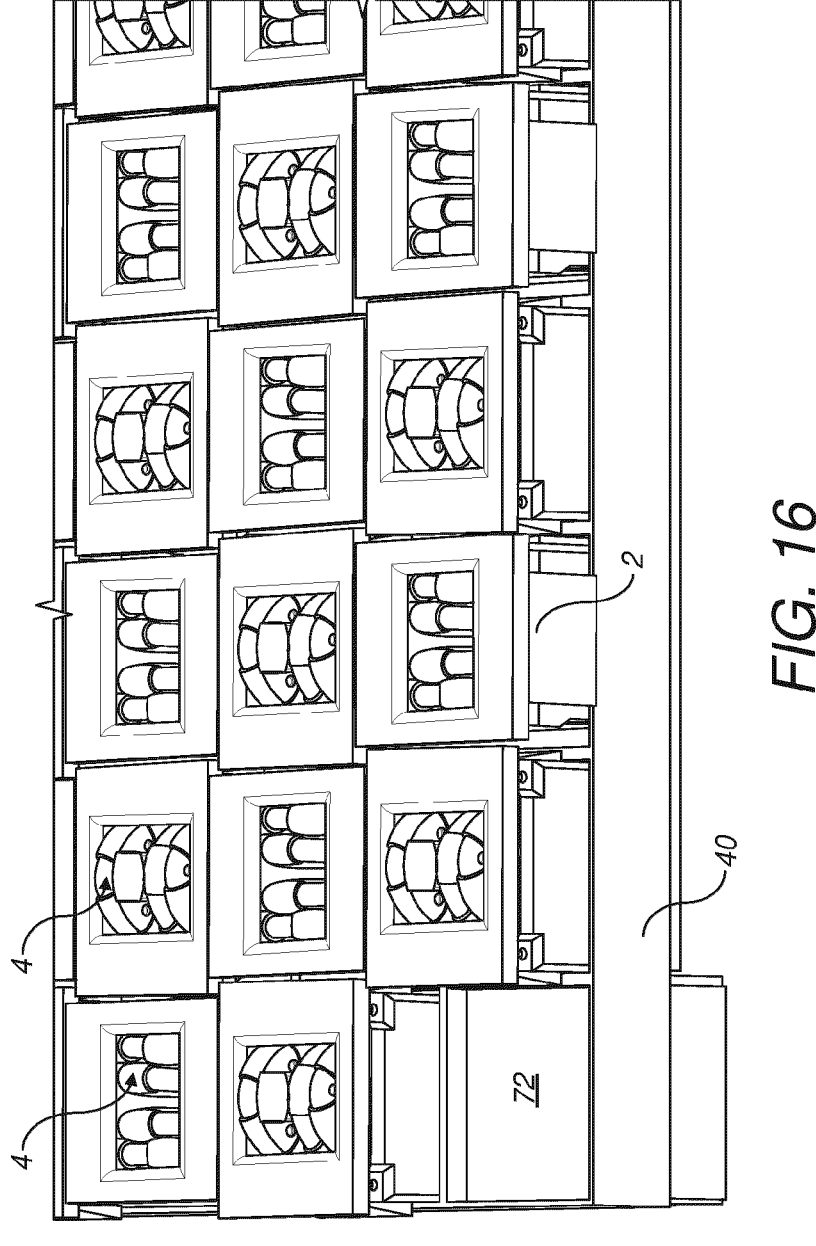
FIG. 16 shows a perspective view of a conveying frame and conveyor modules.

FIG. 15 shows a conveying frame 40 filled with multiple conveyor modules 2 to form a transporting or conveying surface. As can be seen in FIGS. 15 and 16, there is an empty space 72 at each corner of the conveying frame 40. The empty spaces 72 are for receiving support structures (not shown) for additional components, examples of which will be described later.

The conveyor modules 2 are inserted into the conveying frame 40 in an alternating, or chess-board-like, pattern, which can be most clearly seen in FIG. 16. By alternating we mean that when looking at the conveying frame 40 from above, the omnidirectional wheels 4 in a conveyor module 2 alternate between being arranged in a forwards-backwards driven direction and a left-right drive direction. The driven direction of the omnidirectional wheels 4 within a conveyor module 2 may be considered as a longitudinal axis of the conveyor module 2. The alternating arrangement of conveyor modules 2 therefore means that the longitudinal axis of the plurality of conveyor modules 2 alternates between being aligned at 0 degrees and aligned at 90 degrees, the angles of alignment being defined in relation to the conveying frame 40 when viewed from above. Thus, as illustrated in FIG. 16, the omnidirectional wheels that are aligned at 0 degrees may be considered as being orientated up-and-down along the conveying frame 40 and the omnidirectional wheels 4 that are aligned at 90 degrees may be considered as being orientated left-and-right across the conveying frame 40.

The arrangement of the slots 64, 66 in the baseplate 58 facilitates this alternating arrangement of conveyor modules 2. As discussed previously, and as illustrated in FIG. 10, the primary 64 and secondary 66 slots in the baseplate 58 are differently sized, as they each receive a different component of the conveyor module 2. Specifically, the primary slot 64 for receiving the chute 30 is larger than the secondary slot

66 for receiving the portion 29 of the control mechanism 28. This means that each conveyor module 2 can only be inserted into an aperture 42 in one orientation only, in order that the chute 30 and extending portion 29 can engage with the primary and secondary 64, 66 slots. As shown in FIG. 10, the slots in each aperture 42 are arranged in an alternating pattern in which the slots of one aperture are aligned with 0 degrees and the slots of an adjacent aperture are aligned with 90 degrees. This means that the conveyor modules 2 will automatically be arranged in an alternating manner when they are inserted into the conveying frame 40 as a result of the orientation of the baseplate slots 64, 66, and so it would not be possible to insert a conveyor module 2 with an incorrect orientation into the conveying frame 40.

As mentioned previously, the omnidirectional wheels 4 allow objects to be pushed forward and backward by the wheel 4, as is the case with any other wheeled device. However, the moveable segments of the wheels 4 allow objects to passively roll left and right over the wheel 4.

As a result of the use of omnidirectional wheels 4 in the conveyor modules 2, the alternating pattern of conveyor modules 2 in the conveying frame 40 can freely move any object in any direction, provided that the object is in contact with at least two omnidirectional wheels 4 that are aligned 90 degrees in relationship to each other.

Since each conveyor module 2 can provide a driven force in one direction, when many conveyor modules 2 are arranged together, with a 90 degrees rotation alternating back and forth between adjacent conveyor modules 2, the resulting transporting surface can apply a driven force in both the x and y directions and any sum of these. For example, movement in the x direction can be achieved by only driving omnidirectional wheels 4 that "point" in the x direction and diagonal movement can be achieved by turning on all omnidirectional wheels 4 under an object. Thus, not all conveyor modules 2 need to be driven at any given time. Instead only the conveyor modules that are needed to cause movement of a package are activated. This is illustrated in FIG. 17.

Figure 17:
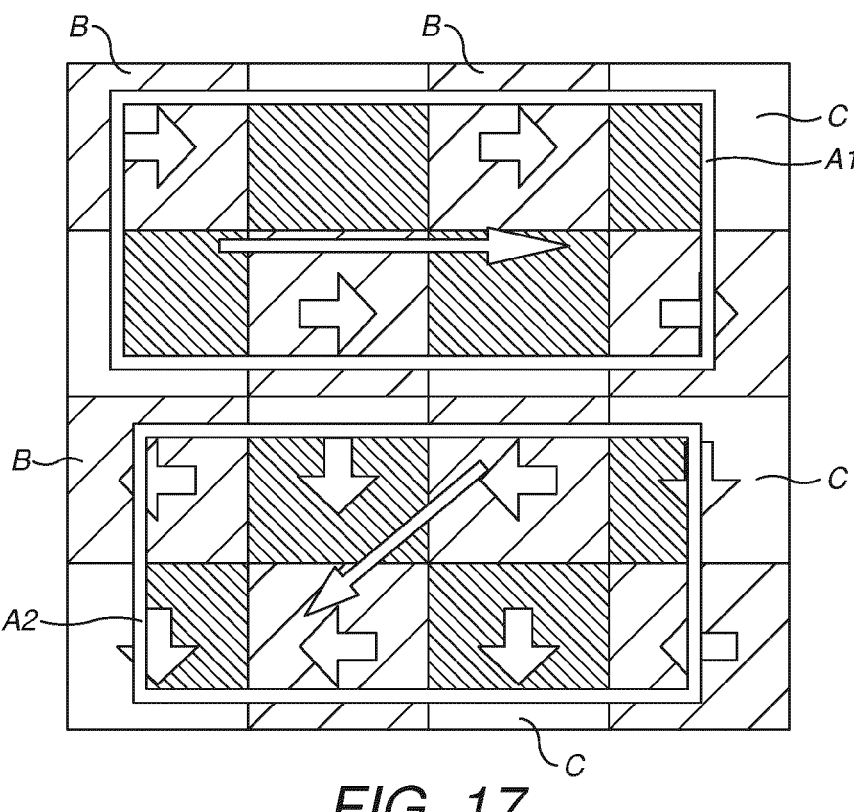
FIG. 17 shows a schematic view of conveyor modules and an object.

FIG. 17 shows two outlines A1, A2 with represent two packages on a conveying surface. One set of squares B can apply horizontal movement (left and right across the page) while the other set of squares C in the alternating pattern can apply vertical movement (up and down along the page). The first package A1 is moved in a horizontal direction by the driven horizontal squares B, and moving passively over the vertical squares C. The second package A2 is moved in a diagonal directions as a result of the sum of the driven forces applies by both squares B and C.

The conveying frame 40 essentially acts as an omnidirectional drive, capable of controlling the omnidirectional wheels 4 of each conveyor module 2 independently from each other. That is, the movement of the omnidirectional wheels 4 of any one conveyor module 2 is independent from the movement of the omnidirectional wheels 4 of any other conveyor module 2. In other words, the omnidirectional wheels 4 do not all need to be active and in motion at the same time; only the wheels necessary to effect movement of a package need to be driven at any given time. This allows for precise and individual control of packages on the transporting surface.

The particular arrangement of conveyor modules 2 in the conveying frame 40 to form the alternating grid-like pattern means that the space between adjacent (adjacent in both the vertical and horizontal direction) conveyor modules 2 is relatively small, and so the distance between omnidirectional wheels 4 is also small. This means that there is a relatively high density of omnidirectional wheels 4 over the entire transporting surface. This leads to high movement precision as a package does not need to travel a great distance before its movement can be adjusted e.g. its direction of travel changed. Additionally, a relatively high density of conveyor modules 2, with a corresponding small distance between omnidirectional wheels 4, means that smaller packages can be moved around over the transporting surface.

Particular control of the omnidirectional wheels 4 to effect particular movement of a package on the transporting surface is ultimately undertaken by the main control system, which sends commands to the control mechanism 28 via the control system 60 of the conveying frame 40.

The control system 60 of the conveying frame 40 is connected to the main control system, which has overall control of the conveying frame 40 and conveyor modules 2 of the conveying system. The PCBs 62 of the control system 60 communicate with the main control system using an Ethernet connection. Each PCB 62 of the control system has an Ethernet cable, and the plurality of Ethernet cables are combined into a main Ethernet switch which is routed to the main control system, creating a LAN network. A LAN network and the associated Ethernet protocols are an efficient and scalable means of communicating between a central control system and the control system 60.

The control system forms part of an overall planning system. Generally, the planning system is the system which controls the movement of packages through the conveying system to ensure they reach their end destination.

The planning system includes an information acquisition system, a processing system, and a main control system. The information acquisition system is arranged to obtain package information from the package, wherein the package information comprises a destination location of the package. The processing system is configured to determine a route of the package from the scanning location to the destination location. The main control system is configured to communicate with the previously described conveying system, wherein the main control system is configured to control the driving mechanism of the conveyor module such that the package is moved across the substantially planar surface along the determined path from the scanning location to the destination location through rotation of the rotatable elements. Further details will be provided in the following.

In order to determine an end destination of each package, each package first needs to be entered into the planning system. Once the package has been entered into the system, information associated with the package can be retrieved, for examples the package ID and its end destination, and these can be used by the planning system to plan a route for the package to travel across the transporting surface to its end destination.

Thus, in order for the planning system to know what to do with each individual package, the package needs to be identified and matched with the package in the database provided by a customer. This is done by obtaining information about the package using the acquisition system. In some examples, the acquisition system takes the form of a scanning system. In this case, the scanning system scans a barcode on the package and searches for the code in the database provided by the customer.

In particular, when a new package is placed on to the system, by placing the package on the transporting surface at a starting location, it will be driven, or moved, to a scanning area by the omnidirectional wheels 4 which make up the transporting surface. Once the package reaches the scanning area, the barcode on the package is scanned. This may be done using any suitable imaging apparatus such as a barcode scanner or a camera.

The scanning system comprises a plurality of scanning apparatus, positioned at different locations and pointing in different directions. This allows the scanning system to identify and scan a barcode anywhere on the package. In particular, in the scanning area, scanning apparatus will be located above the scanning area and pointing below, in order to capture barcodes on the top of packages. Scanning apparatus will also be positioned around a horizontal perimeter and pointing inwards to the centre of the area defined by this perimeter, in order to capture barcodes on the sides of the package. Some scanning apparatus will be positioned on the transporting surface and pointing upwards, in order to capture barcodes that are on the underside of a package.

Once the barcode has been located and scanned, the planning system will then search through a database of packages provided by the customer and find the code matching the one from the barcode.

While a scanning system has been provided as an example of an information acquisition system, other systems may also be used. For example, in some cases the planning system may receive information about a new package from an external source. In this case, the information acquisition system may be a processing or computing device arranged to receive information about a package in order to identify the package and match with the package in the database provided by a customer.

After the package has been identified, the planning system can also look up the end destination of the package, using the database, so that the planning system is able to plan operations and movement of the package accordingly.

The movements of the package are determined by the processing system. The processing system includes an observation system, for observing the package and its movements, and a planning system, for determining the route the package takes across the transporting surface.

In general, the planning system uses a machine learning algorithm to determine the movement steps for all packages in the system. This has the advantage that the algorithm will optimize itself for every deployed system, taking into account the physical setup of the system (e.g. floor geometry, number of floors), the operation pattern, the number of other packages being moved, and the size and shape of the packages.

The observation system comprises a plurality of video cameras which are able to detect and track the packages as they move across the transporting surface. The plurality of video cameras are placed above the transporting surface, looking down at the transporting surface. The transporting surface of the overall system will generally be made up of multiple conveying frames located next to each other, in order to build up the shape of the desired overall transporting surface. In general there are several cameras above each transport module. The video stream from the video cameras is used by a software algorithm to look at the stream from the cameras and detect and continuously track packages in the feed.

The observation system and planning system work together, as the processing system, to route a package across the transporting surface, avoiding other packages and obstacles, to its end destination. The planning system plans a movement sequence for a package and this sequence is executed by sending appropriate commands to the conveyor modules 2 to control movement of the omnidirectional wheels 4. The planned movement sequences are determined by the mode of operation. One example mode of operation is referred to as "Sequencing", where packages are moved around until they are sitting on the transporting surface in a desired order/sequence. This operation may be carried out before packages are taken out of the system one by one and placed in a truck so that the order of placement in the truck matches the order of unloading when the truck is driving through a delivery route.

The main control system is a general software system that uses observation data from the observation system to control the movement of packages. The control system takes in as input the desired state of each package (position and rotation) and produces a set of control commands that move the package toward its desired state. While doing this, the control system uses the run time data from the observation system in order check for errors in movement trajectory and produce adjustment commands as and when is necessary.

Each movement command is first expressed in a vector form [linear velocity, angular velocity] where each vector represents the linear and angular velocities that the package should have during the specific time step. Then, a vector field is created for each package that will, when applied as commands to the conveyor modules 2, result in the desired linear and angular velocities. Finally, the vector field is only applied to the conveyor modules 2 directly beneath the package (here, the observation data is again used to determine which conveyor modules 2 are beneath each package).

Finally, because each omnidirectional wheel 4 can only produce a horizontal or vertical force field element, the control signal sent to each conveyor module 2 represents only the vector component of the field element that is parallel to the direction of the omnidirectional wheels 4 on that particular conveyor module 2. For example, if a uniform vector field that is to be applied is [2,1], (meaning 2 in the horizontal direction and 1 in the vertical direction), a control signal of 2 is sent to all conveyor units 2 that can apply force in the horizontal direction and a control signal of 1 is sent to all conveyor units 2 that can apply force in the vertical direction. In the end, this number of the control signal is converted to actual RPM (so 2 may represent maximum RPM in clockwise direction, 1 may represent 50% of maximum RPM in clockwise direction and −2 may represent maximum RPM in counter clockwise direction).

The general steps of operating the planning system will now be briefly described.

Firstly, a package is placed on the transporting surface. This is generally done at a start location on the transporting surface. The package is then immediately imaged and detected by the observation system in order to enter the package into the overall system. The detected package is then assigned an ID so that the package can be identified and tracked within the system. The IDs are assigned so that no two packages on the transporting surface at the same time have the same ID. A "package instance" is created which contains relevant information about the package, for example its current location and its dimensions. The planning system is informed about the new package and a command to move the package is produced. The first movement command is typically to send the package to the scanning area so that the scanning system can identify the end destination of the package, using the barcode, and the planning system can subsequently plan movement of the package accordingly.

As the package moves along the transporting surface the observation system tracks the package by using the positional information from previous time frame captured by the video cameras and comparing it to the positional information in the current time frame. Positional information used to track the package along the transporting system include xy-coordinates, the dimensions of the package, and the orientation of the package on the transport surface.

A number of assumptions are used to match detections from a current frame with packages identified in a previous frame, as follows:

i) A package could not have moved an unreasonable distance between two frames (time between two frames is typically in the range of $\frac{1}{20}$ of a second).

ii) A package could not have changed its angle an unreasonable amount between two frames.

iii) A package has the same dimensions throughout its lifetime.

iv) The package's movement vector correlates with the movement command given, which means that it is highly unlikely that the package has moved 1 cm to the right if it was given the command to moved 1 cm to the left.

As already discussed, the physical surface of the transport surface has a chess board-like pattern that makes detection of packages easier and more precise. This is due to the fact that the planning system knows about the chess board pattern, what it looks like, and that this pattern is the same all the time and everywhere on the surface. Therefore, detecting objects on the surface having this pattern becomes easier because the system can use the regularity of the pattern to better detect objects on the surface.

As previously mentioned, and with reference to Figured 15 and 16, the conveying frame 40 comprises a number of empty spaces 72 and the corners of each conveying frame 40, for receiving a number of additional structures. In some cases, the empty spaces 72 may receive mounting structures for the video cameras of the observation system.

In other examples, a second transporting surface may be present comprising a second layer of conveying frames 40 located above a first layer. In this case, the empty spaces provide the support structure on which the second layer of conveying frames is supported.

In planning system that comprises multiple layers of conveying frames, one or more elevator modules are present to allow a package to travel between the different layers. An elevator module is a conveying frame that is able to travel vertically up and down. This is achieved by employing a mechanical elevator systems such as a rack and pinion systems, in the empty spaces 72. In this example four rails would be located in each of the empty spaces 72, each rail having a rack along the vertical length of the rail. The elevator module would include four motors with corresponding gears that are connected to the racks.

Actuation of the motors causes the gears to turn and move the elevator up or down. Further in this example, the transport module also has several rollers that are mounted onto the rails. These rollers provide alignment and stability, ensuring that the elevator module always sits on the rails correctly and the gears remain in good contact with their racks.

A multi-level planning system has a number of advantages. Firstly, the resulting system is very modular. At any point where there is a conveying frame on one level, a new floor or level can be added by simply putting a new set of rails on top of any existing rails. Some large multi-layer systems may use a cable-based elevator system instead of a rack and pinion.

Secondly, the resulting system easily allows for two elevator modules to be placed within the same vertical column, meaning that two elevator modules operate using the same elevating system, whilst allowing the elevator modules to operate independently of one another.

In summary, the planning system comprises hardware and software aspect. The hardware primarily consists of multiple conveying frames, each having a surface that can move packages freely in all directions. This surface may be referred to as an omnidirectional conveyor belt. Optionally, the hardware may include multiple elevator modules to move the transporting surface up and down. Several conveying frames can be stacked on top of one another with elevator modules connecting the different floors together. Both the conveyor module and the transport module are designed such that they can be stacked together in all directions, thus allowing for formation of systems that can cover any surface area and have an arbitrary amount of floors. Packages can then move freely on each floor using the conveyor module(s) and between floors using the elevator module(s). An overarching software system uses video cameras to detect and track packages. It also plans the movement of the packages and implements the appropriate movement controlling routines and procedures.

The planning system is a modular omnidirectional conveyor belt system capable of moving packages freely, in some cases in three dimensions. The system has the ability to perform complex sortation, storage, retrieval, and other sequences of operations with many packages simultaneously in parallel (parallel execution of operations in the same space).

The above description relates to an exemplary conveying system for conveying objects over a transporting surface. In the following, alternative examples of at least some of the components of the conveying system will be described. It will be understood that any alternative component can generally be used in combination with any previously described component in order to construct a conveying system as previously described. For example, an alternative conveyor module may be used with a previously described conveying frame to provide an alternative conveying system. The following discussion relates to various modifications of the conveyor module.

Figure 19:
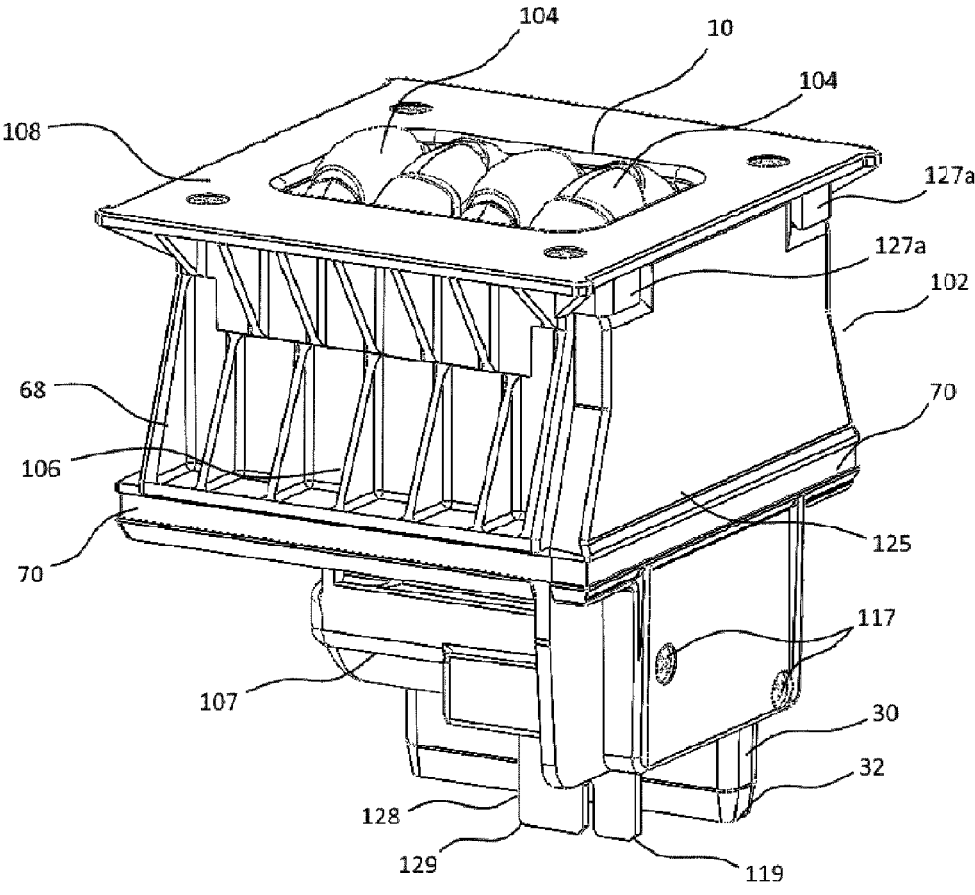
FIG. 19 shows a perspective view of a conveyor module.

An alternative example of a conveyor module 102 is shown generally in FIG. 19. Generally, this conveyor module 102 is functionally similar to the conveyor module 2 previously described and shown for example in FIG. 1 in that this conveyor module 102 is a singular unit that includes rotatable elements in the form of actuated omnidirectional wheels 104 for allowing a force to be applied to a parcel in one direction while also allowing a parcel to passively roll over the omnidirectional wheels 104 in the perpendicular direction.

As before, this conveyor module comprises a housing 106, a motor 120 and gears 118 (as shown in FIG. 20), and a control mechanism 128 in the form of a PCB. Unless stated otherwise, these components are substantially the same as described previously. Features and components common to both exemplary conveyor modules will not be described again.

Looking again at FIG. 19, the design of the housing 106 has been modified in order to reduce the complexity of the housing 106. Previously, the motor 20 and control mechanism 28 were located inside the housing 6, for example as illustrated in FIG. 4. In this alternative arrangement, the housing 106 has been reduced in size so that the motor 120 and the control mechanism 128 are no longer enclosed by the housing 106. Instead, the motor 120 and at least part of the control mechanism 128 are located within a casing 107, which is separate from the housing 106. This is illustrated in FIG. 20 which shows an exploded view of the conveyor module 102 and the casing 107 being a separate component from the housing 106. The motor 120 and the control mechanism 128 are therefore not installed directly into the housing 106. Instead, these components are independent of the housing 106. As with previously described examples, the motor 120 forms part of the driving mechanism along with the plurality of gears 118 shown in FIG. 20. Thus, in this example, at least part of the driving mechanism is located within the casing 107.

Figure 21:
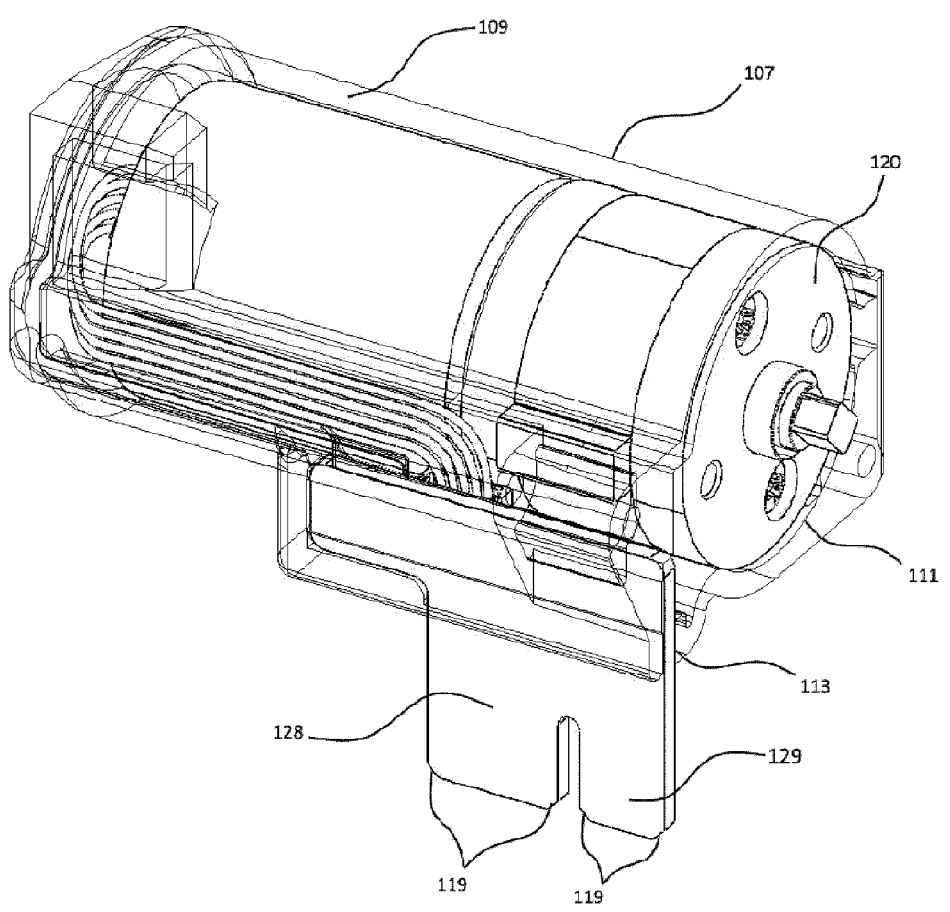
FIG. 21 shows a perspective view of part of a conveyor module.

FIG. 21 shows the casing 107 in more detail. As can be seen, the casing 107 comprises a generally cylindrical body 109 having an opening 111 at one end to allow at least part of the driving mechanism, specifically the motor 120, to be placed inside and generally enclosed by the cylindrical body 109 of the casing 107. The casing 107 also comprises a channel 113 for receiving at least a portion of the control mechanism 128, as shown in FIG. 21. In particular, the casing 107 at least partially houses the printed circuit board of the control mechanism 128.

Placing part of the driving mechanism such as the motor 120 and part of the control mechanism 128 in a casing 107 that is separate from the housing 106 provides easier access to both the motor 120 and the control mechanism 128 allowing fast replacement of these components. This advantage can be seen at least from FIG. 19 which shows that the casing 107 is external to the housing 106 and accessible independently from the housing 106.

Figure 22:
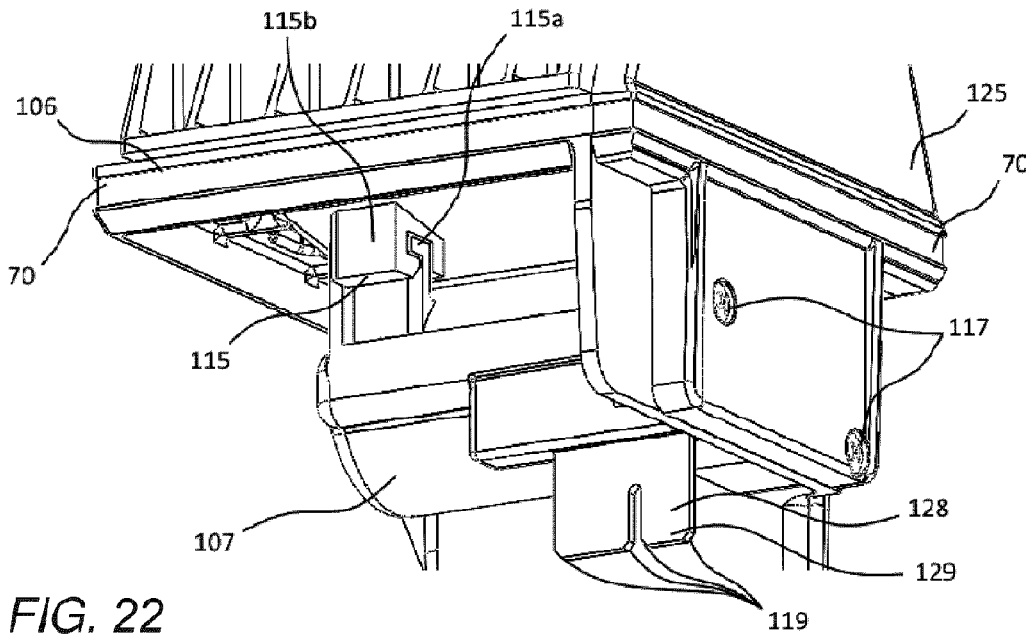
FIG. 22 shows a perspective view of part of a conveyor module.
Figure 23:
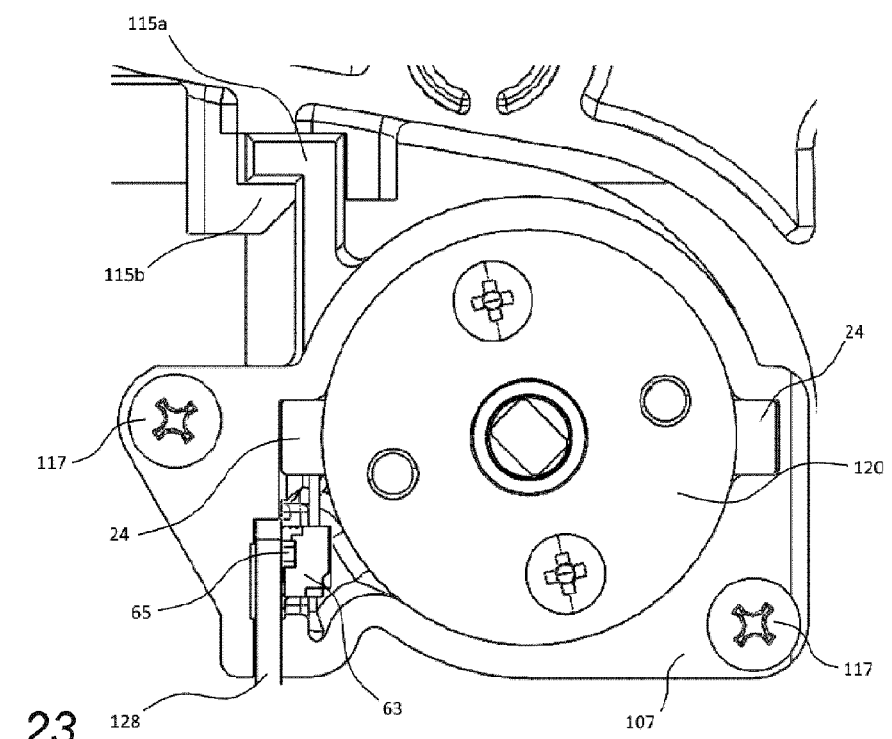
FIG. 23 shows a side view of part of a conveyor module.

The casing 107 can be secured to the housing 106 using an interlocking mechanism 115. Generally, the interlocking mechanism comprises a first interlock member in the form of a first hooked protrusion 115a located on the casing 107 and a second interlock member in the form of a second hooked protrusion 115b located on the housing 106. The first and second interlock members 115a, 115b are arranged to releasably engage with each other in order to releasably secure the casing 107 to the housing 106. FIGS. 22 and 23 illustrate the casing 107 wherein the first hooked protrusion 115a is configured to interlock with a corresponding second hooked protrusion 115b on the housing 106. Additional securing means may also be used to help secure the casing 107 to the housing 106. For example, FIGS. 22 and 23 illustrate additional securing means in the form of screws 117 which are used to secure the casing 107 to the housing 106. In this way, the housing 106 may be arranged to at least partially support the weight of the casing 107.

The use of a separate casing 107 and an interlocking mechanism 115 reduces the overall complexity of the housing 106 which in turn reduces manufacturing and material costs. As previously described, a back plate was required to cover the motor in order to protect the motor dust and damage as well as prevent movement of the motor within the housing. Additionally, the use of the casing 107 for housing the motor 120 avoids the need for the back plate, leading to fewer parts overall. As well as being cheaper to manufacture, fewer overall parts results in fewer potential components which could fail. Furthermore, isolating the control mechanism 128 from the housing 106 by placing it within a separate casing 107 allows for replacement of the casing 107 if the control mechanism 128 fails, rather than the whole housing 106. This improves the useable lifetime of the conveyor module 102.

In a similar manner to previously described examples, the control mechanism 128 of this example comprises a portion 129, specifically a distal portion comprising at least part of the printed circuit board of the control mechanism 128, which extends beyond the casing 107 of the conveyor module 2. This can be seen, for example, in FIGS. 21 and 22. As before, when the conveyor module 102 is inserted into an aperture 42 of the conveying frame 40, the extending portion 129 of the control mechanism 128 is received by the PCI connection interface 61 on the PCB 62 of the conveying frame 40 in order to connect the control mechanism 128 of the conveyor module 102 to the control system 60 of the conveying frame 40.

Figure 24:
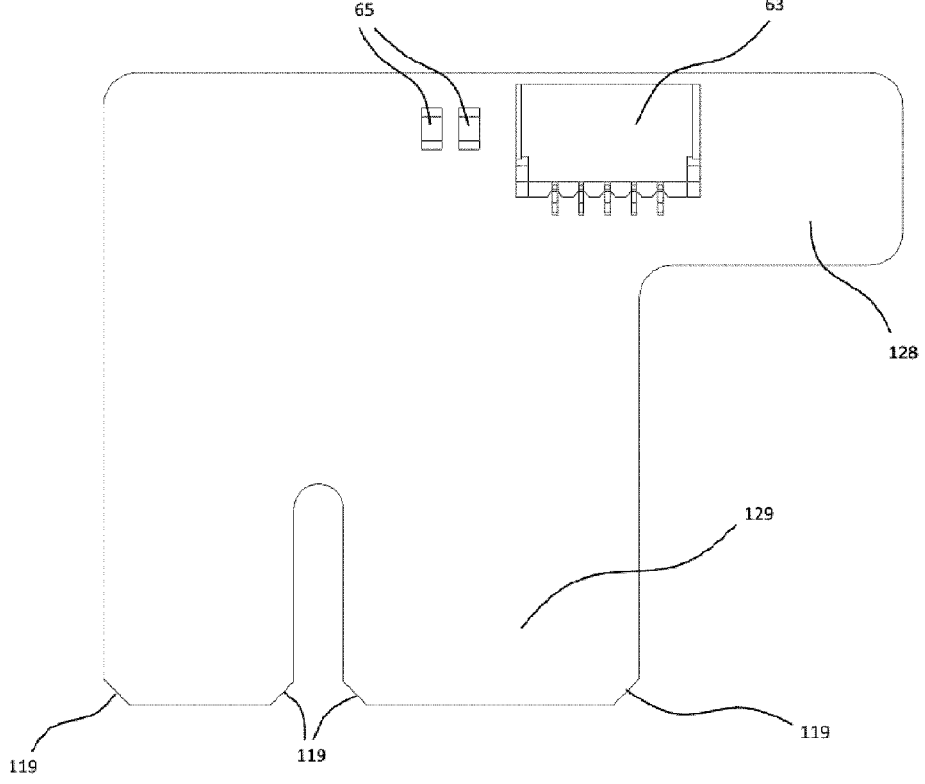
FIG. 24 shows a side view of part of a control mechanism.
Figure 25:
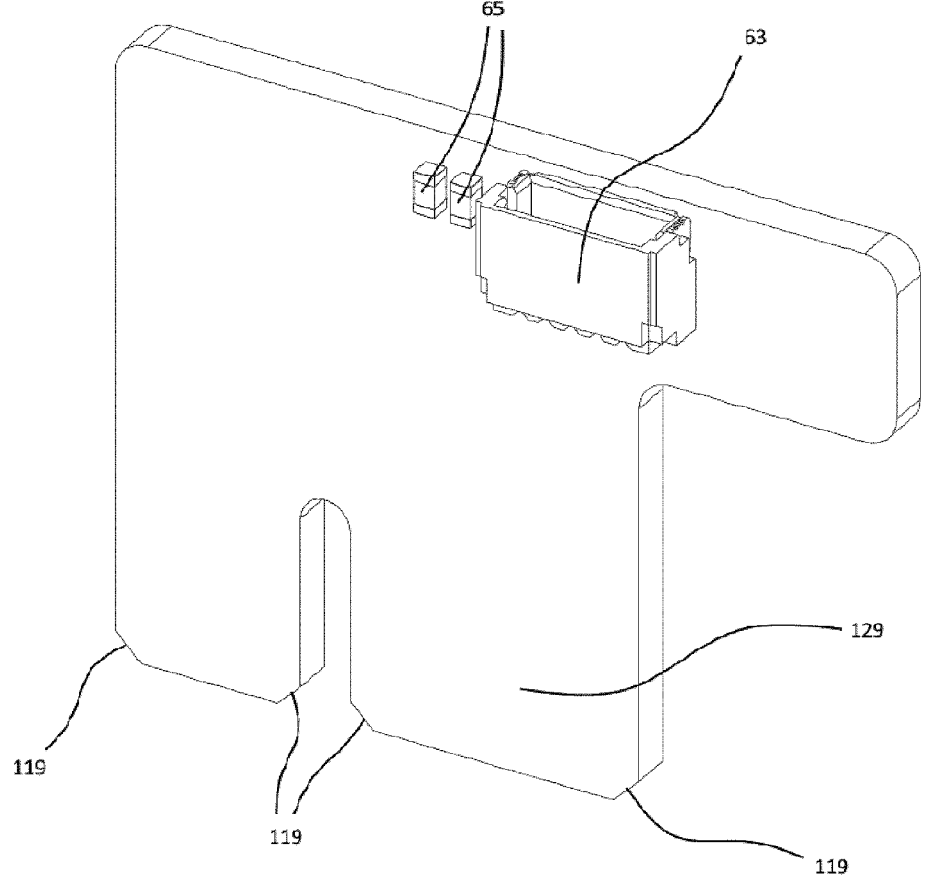
FIG. 25 shows a perspective view of part of a control mechanism.

To further help ensure correct alignment of the extending portion 129 with the PCI connection 61 on the PCB 62, the extending portion 129 comprises chamfered corners 119 as shown in FIGS. 24 and 25. In particular, the chamfered corners are at least one pair of opposing corners which are located at a distal end of the extending portion 129. In some examples, this design gives the extending portion 129 a slightly tapered shape. The chamfered corners 119 reduce the width of the extending portion 129 at the end of the extending portion 129 and so less precision is required when inserting this end into the PCI connection 61. In particular, the chamfered edges 119 allow for a higher degree of misalignment before the extending portion 129 will not enter the PCI connection 61. The chamfered corners 119 also reduces the chance of a corner becoming stuck on another component during insertion, and so it is both quicker and easier to insert the conveyor module 102 into the conveying frame 40. In some examples, the control mechanism 128 comprises tapered edges around the substantially the whole outer perimeter of the control mechanism 128.

To reduce the cost and complexity of the control mechanism 128, a number of electrical components previously forming part of the control mechanism 128 can be moved to the PCB 62 of the conveying frame 40. For example in some designs, such as that shown in FIGS. 24 and 25, the control mechanism 128 may only include a connector 63 (for example, to provide an electrical connection between the control mechanism 128 and the motor 120 as shown in FIG. 23) and two capacitors 65, which serve to prevent current spikes going through large parts of the electronics. Moving many of the electronics from the control mechanism 128 to the PCB 62 helps avoid the need to support re-programming the control mechanism 128 itself when changes or upgrades are required.

Figure 26:
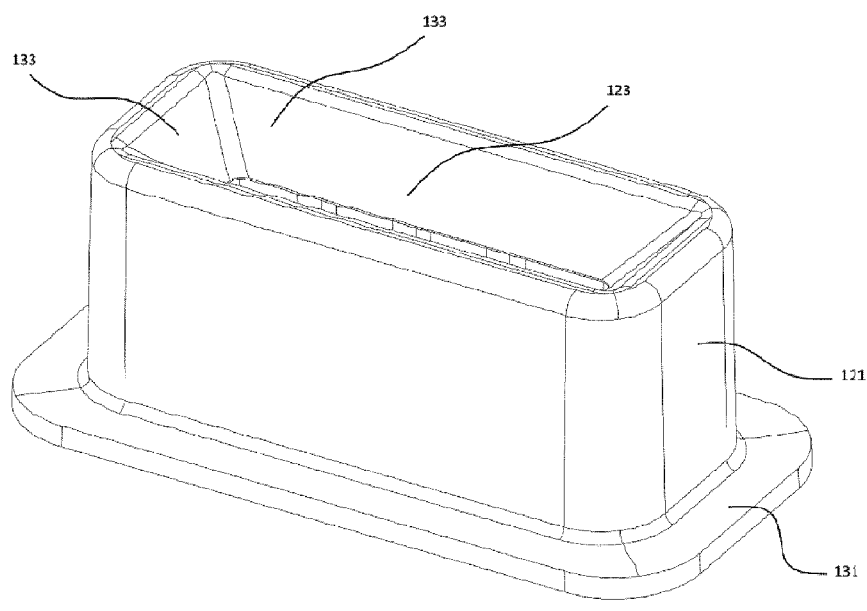
FIG. 26 shows a perspective view of a socket.

In some examples, the conveying frame 40 may be provided with a socket 121 for example as shown in FIG. 26. The socket 121 is configured to at least partially cover at least part of the control system 60 on the conveying frame 40, in particular the PCI connector 61. The socket 121 may be considered as a form of cover. The socket 121 both protects the PCI connector 61 from damage (e.g. due to fluids) and acts as a guide to facilitate insertion of the conveyor module 102 into the conveying frame 40.

Figure 27:
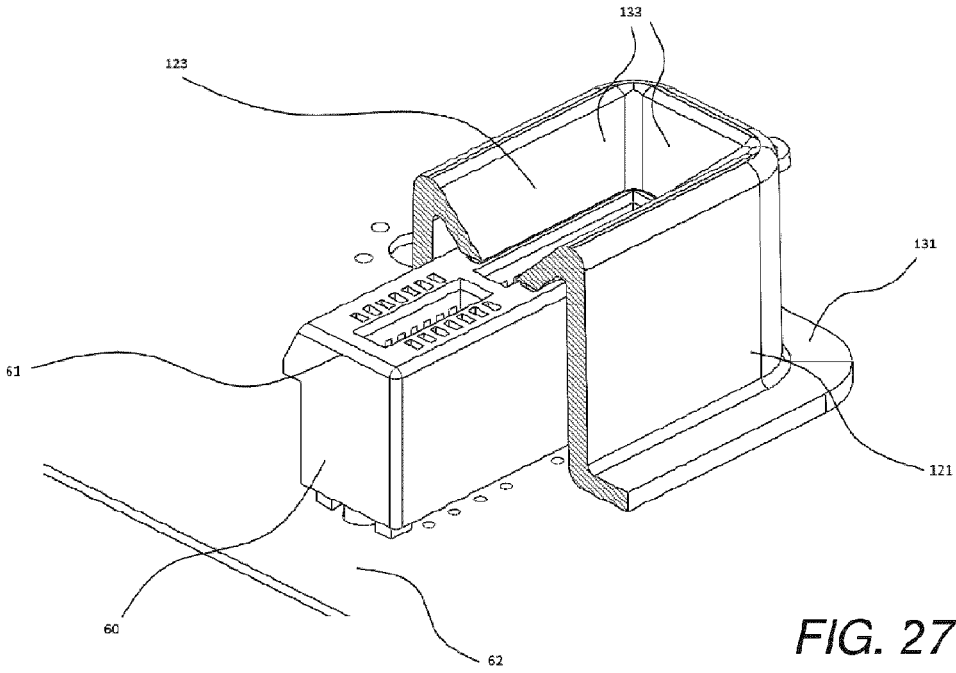
FIG. 27 shows a perspective view of part of a socket.
Figure 28:
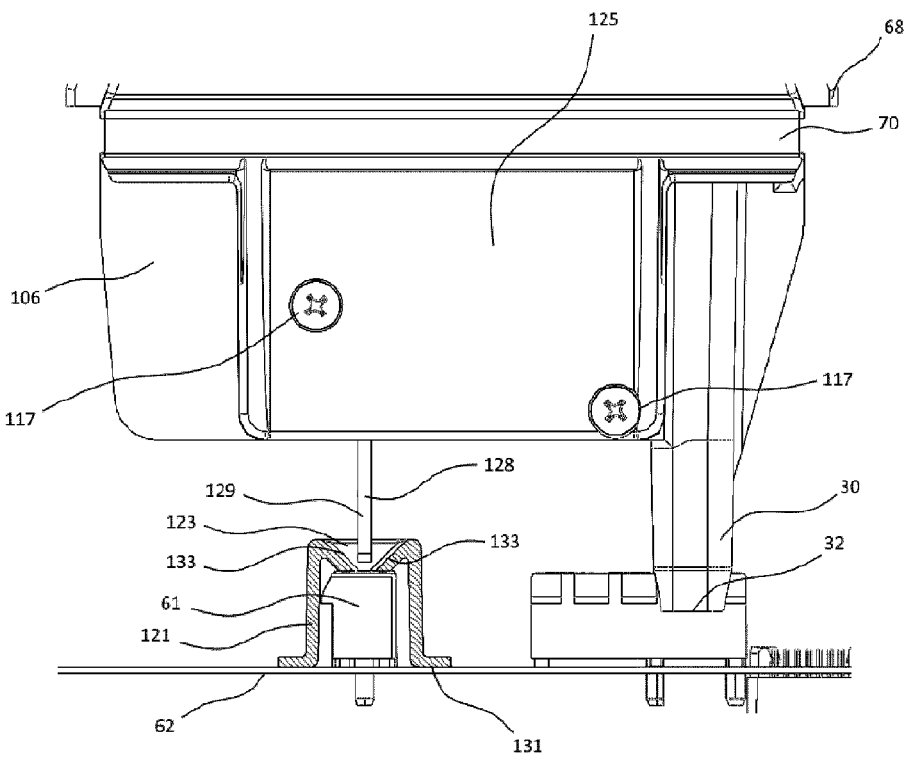
FIG. 28 shows a side view of a conveyor module and conveying frame.

As illustrated in FIG. 27, the socket 121 is generally sized and shaped to house the PCI connector 61. A base 131 of the socket 121, which generally comprises a flange, is attached to the PCB 62 of the conveying frame 40. The socket 121 comprises an opening 123 to allow the extending portion 129 of the control mechanism 128 to be inserted through the socket 121 and into the PCI connector 61 to form an electrical connection. The opening 123 can be considered as having a generally funnel shape, the funnel shape tapering towards the PCI connector 61. In more detail, and as illustrated in FIGS. 26 and 27, the opening 123 of the socket 121 comprises a plurality of internal sides 133 each of which tapers inwardly from the opening 123 towards the PCI connector 61 housed within the socket 121. Thus, the opening 123 generally comprises a cross section that narrows in the direction of insertion towards the PCI connector 61. The shape of the opening 123 may be referred to as an inverse pyramid. The opening 123 acts to guide the extending portion 129 towards the PCI connector 61, for example as shown in FIG. 28, facilitating connection of the conveyor module 102 with the conveying frame 40.

Looking back at FIGS. 19 and 20, and as with previously described examples, the conveyor module 102 comprises a top lid 108 through which the omnidirectional wheels 104 project and a side plate 125 (which may also be referred to as a gear plate) to cover the gears 118.

Figure 29:
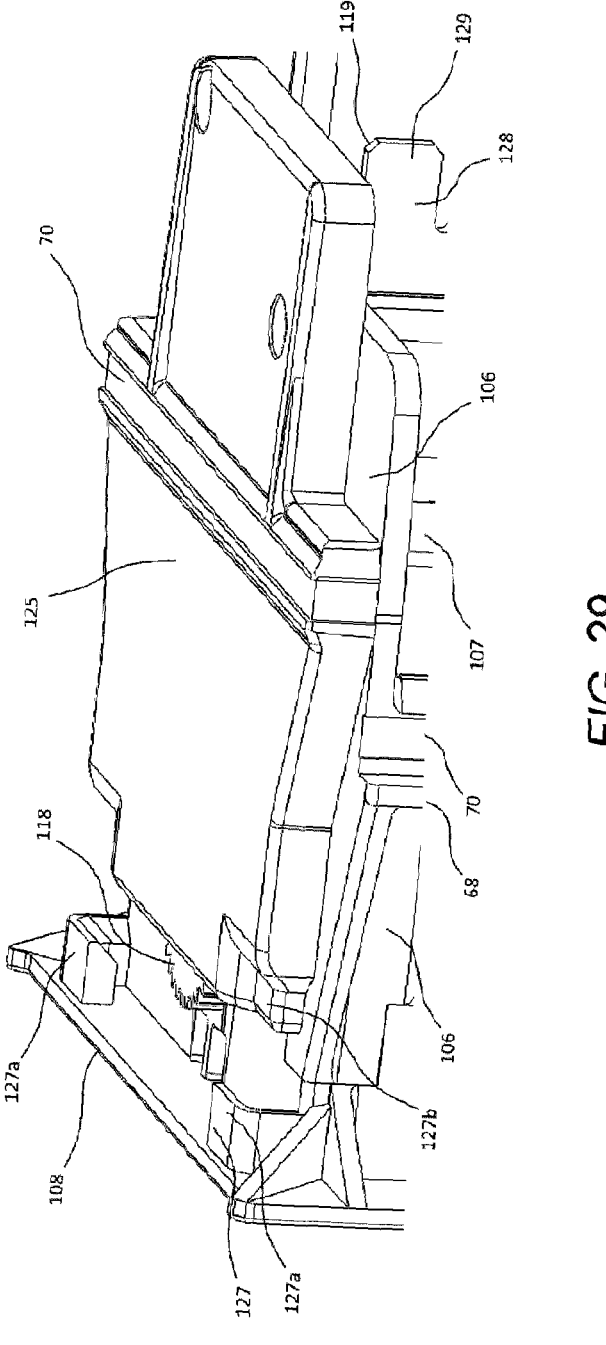
FIG. 29 shows a perspective view of part of a conveyor module.
Figure 30:
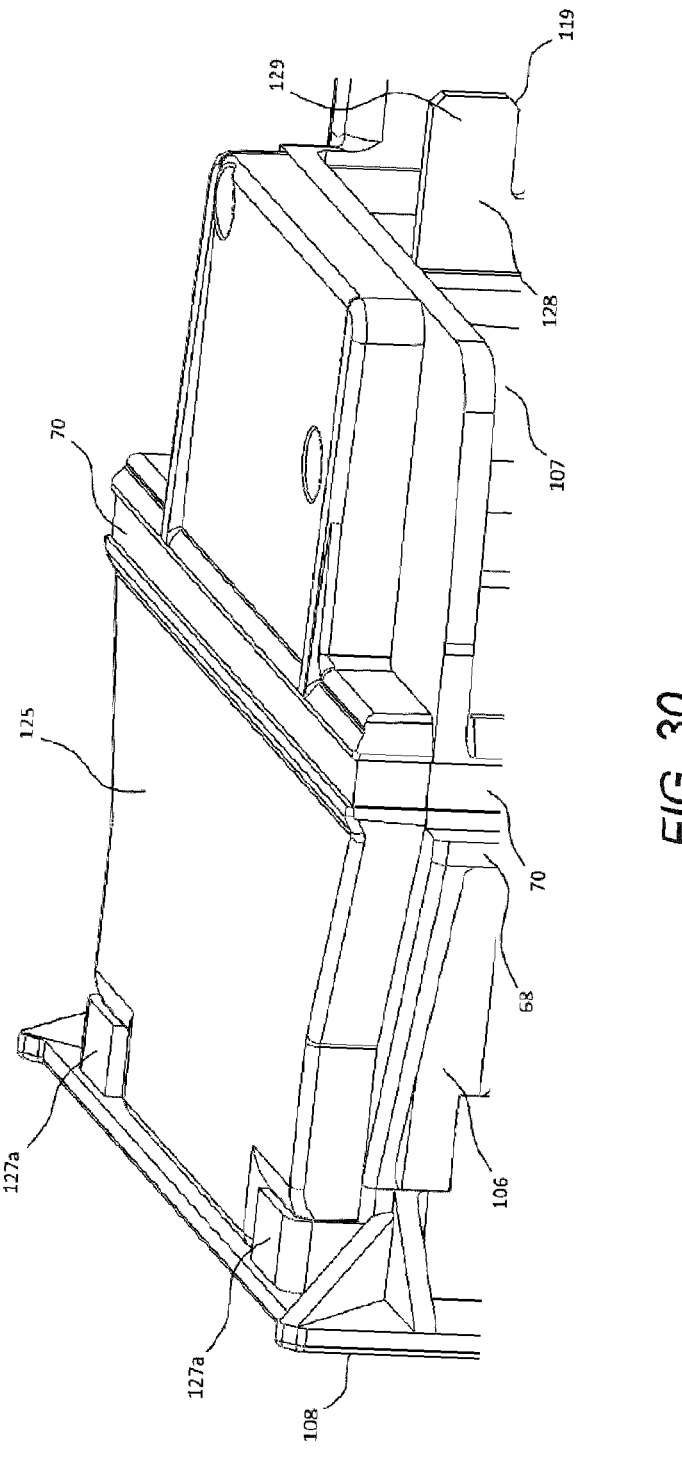
FIG. 30 shows a perspective view of part of a conveyor module.

In order to attach the top lid 108 to the side plate 125, the housing 106 generally comprises a locking mechanism which is to attach the top lid 108 (which can be generally thought of as a first housing part forming an upper surface of the housing 106) to the side plate 125 (which can generally be thought of as a second housing part for covering at least part of the driving mechanism). The locking mechanism generally comprises a locking tab provided on the first housing part which is configured to engage with a locking feature provided on the second housing part. More specifically, as illustrated in FIG. 29, the top lid 108 comprises a number of locking tabs 127 for connecting the top lid 108 to the side plate 125. The locking tabs 127 are located along one edge at two corners of the top lid 108 and generally take the form of an L-shaped bracket 127a. The locking tabs 127 are sized and shaped to receive corresponding locking features 127b on the side plate 125 which take the form of small protrusions as shown in FIG. 29. During assembly the locking features 127b on the side plate 125 can be inserted into the brackets 127a on the top lid 108, as shown in FIG. 30. The top lid 108 facilitates holding the side plate 125 in place. The use of locking tabs 127 reduces the fastener count and the assembly time, and so the time and cost of manufacturing the overall product is reduced. In some examples, screws (not shown) may also be used to fasten the side plate 125 to the housing 106. The locking mechanism is integral to the first and second housing parts. In this way, the locking mechanism is not a separate component and so the overall number of individual components is reduced which reduces manufacturing costs.

In some developments, the drivetrain and gears are made of a polymer such as POM which helps to reduce the running noise and as well as manufacturing costs. The use of POM will also reduce the surface wear on the mating parts, and due to the elastic properties of the polymer, a tighter fit with the cross shaft and motor shaft can be ensured. Thus, there is an improvement both in terms of accuracy and noise.

As described previously in relation to FIG. 16, the conveyor modules are inserted into the conveying frame in an alternating, or chess-board-like, pattern. In order to ensure that a substantially smooth surface is created by the alternating conveyor modules, a number of advantages features can be provided to ensure that the conveyor modules tessellate substantially closely with each other. In particular, the outer perimeter of the top lid 108 has been modified, as will be described with reference to FIGS. 31 and 32.

The top lid 108 has a substantially quadrangular outer perimeter, in particular a rectangular outer perimeter as discussed previously. Providing a conveyor module 102 with a top lid 108 that has a different width compared to the length helps prevent the rows and columns of multiple conveyor modules 102 (when observed from above e.g. as in FIG. 31) from moving relative to each other. Additionally, providing a rectangular shaped top lid 108 prevents installation of a conveyor module 102 in an incorrect orientation within the conveying frame 40. Each conveyor module 102 having a rectangular top lid 108 has a rotational symmetry of 2, as can be seen in FIG. 31.

The top lid 108 further comprises at least one protrusion 143 located substantially at a corner of the top lid 108. The protrusion generally takes the form of a substantially triangular corner 143, which can be most clearly seen in FIG. 32. Each triangular corner 143 is rounded-off, to form a rounded vertex, rather than terminating in a point, so as to prevent objects or packaging from becoming caught or tangled on the corner 143. Rounded corners 143 are also less likely to cause damage to an individual during manufacture or installation. Due to the slight extension of the surface area of the top lid 108 provided by the triangular corners 143, any force applied along the top surface can be spread out over this extended area towards neighbouring conveyor modules 102.

Figure 31:
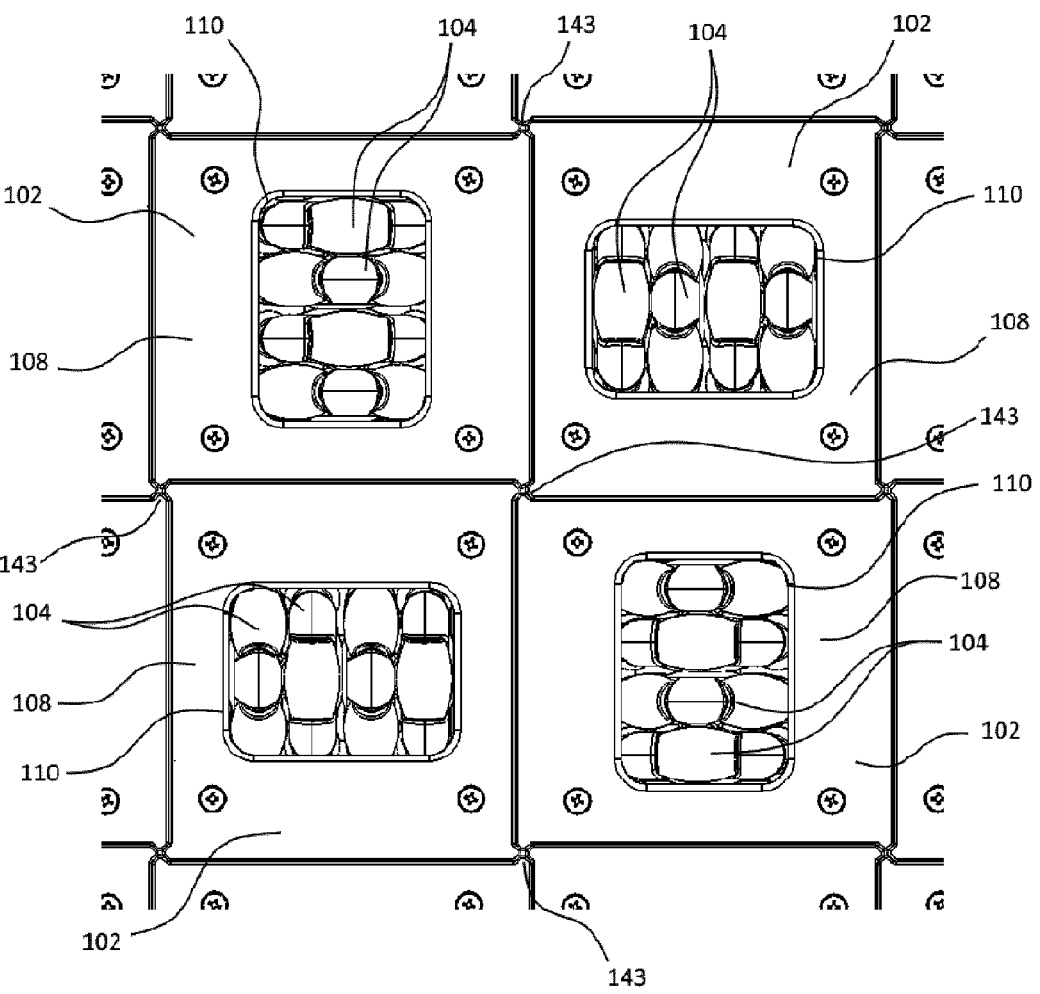
FIG. 31 shows a top down view of a plurality of conveyor modules.
Figure 32:
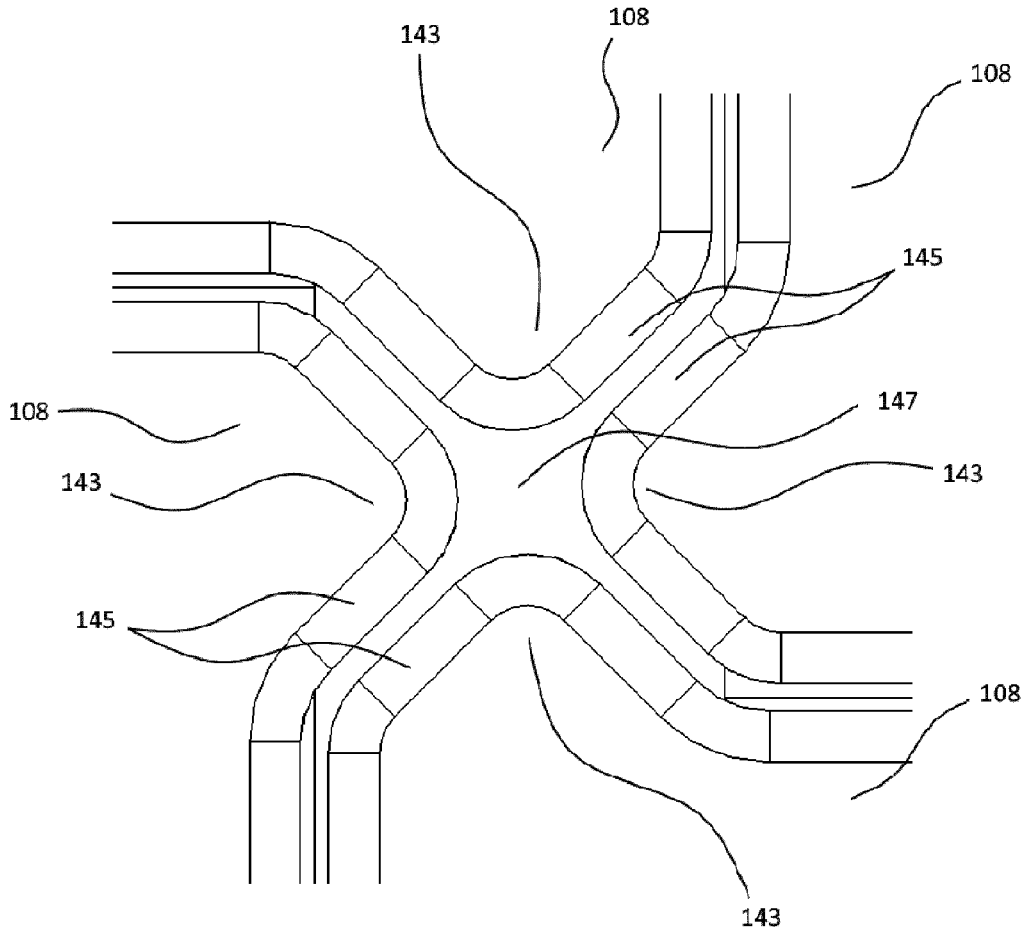
FIG. 32 shows a top down view of part of a plurality of conveyor modules.

As shown in FIG. 31, the top lid 108 of each conveyor module 102 comprises four triangular protrusions 143 located at each of the four corners of the top lid 108. Each of these triangular protrusions 143 is sized and shaped to cooperate with at least on corresponding triangular protrusion 143 on a neighbouring conveyor module 102, for example as can be seen in FIG. 32. In particular, four triangular portions 143 of four conveyor modules 102 are arranged to cooperate with each other such that the four triangular protrusions 143, and therefore the four conveyor modules 102, substantially tessellate with each other. This arrangement may help to minimise relative movement between adjacent conveyor modules 102 which can help provide a more stable surface over which objects can be conveyed.

Although each top lid 108 is generally sized and shaped to generally tessellate with at least one adjacent top lid 108, it can be advantageous to ensure that a gap 147 remains between adjacent top lids 108, for example as shown in FIG. 32. This gap 147 allows for tolerances during construction, particular when inserting each conveyor module 102 into the conveying frame 40. The gap 147 may also allow fluids and debris which may collect of the surface to pass through the conveyor module 102, in a similar manner as previously described in relation to the aperture 10.

As further illustrated in FIG. 32, the outer perimeter of the top lid 108 comprises a slight taper 145 from the top surface of the top lid 108 towards to base of the conveyor module 102. This taper 145 further facilitates easy installation of the conveyor modules 102, while also serving as a draft for the part during demoulding. In addition the tapered perimeter 145 may further facilitate fluids and debris which may collect of the surface to pass through the conveyor module 102, without getting stuck on the perimeter of the top lid 108.

As previously described, for example in relation to FIG. 5, the conveyor module comprises a chute 30 having a passageway 34 into the chamber 36 of the conveyor module 102 in which the omnidirectional wheels 104 are at least partially. The chamber 36 fluidly connects with the aperture 110 in the top lid 108 of the conveyor module 102. The chute 30 acts as a water and dust drainage system, allowing dust and water which enters the aperture 110 to flow through the chamber 36 and passageway 34, and out of the chute 30 via the opening 32 at the lowermost part of the chute 30.

Figure 33:
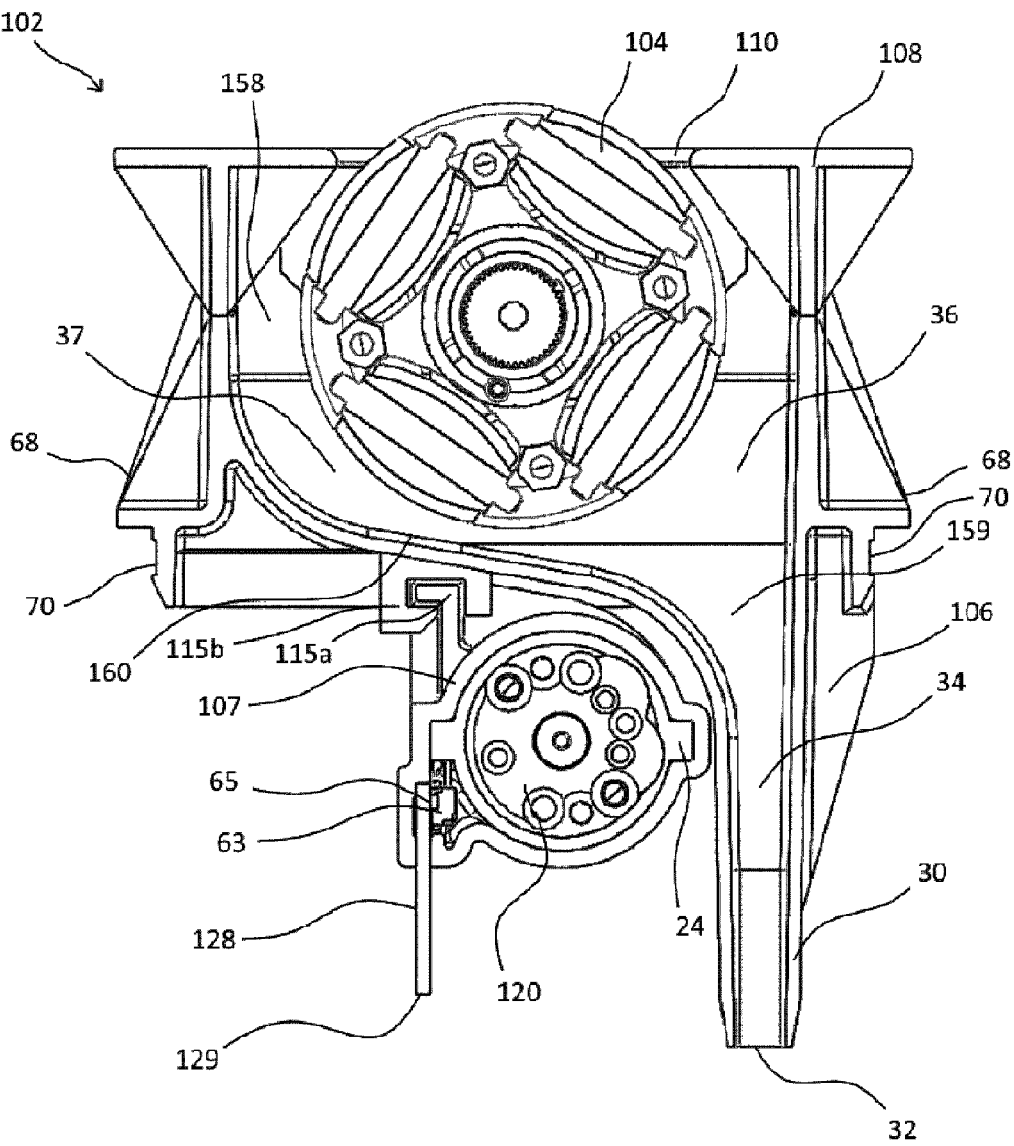
FIG. 33 shows a cross-sectional view of a conveyor module.

The chamber 36 can be thought of as comprising a first opening 158, between the main body of the chamber 36 and the top lid 108, and a second opening 159 between the chamber 36 and the passageway 34. As shown in FIG. 33 (but equally applicable to FIG. 6), at least a portion of the omnidirectional wheels 104 extend through the first opening 158. The aperture 110 in the top lid 108 receives this portion of the omnidirectional wheels 104 such that at least a portion of the omnidirectional wheels 104 also extends through the aperture 110 in the top lid 108, as described previously. The top lid 108 acts to at least partially cover the first opening 158 in the chamber 36.

The chamber 36 comprises a base 160, which can also be considered as a base of the housing 106. As shown in FIG. 33, the base 160 is generally downwardly sloped and the second opening 159 is located at the lowermost part of the sloped base 160. The through passageway 34 extends between the second opening 159 and the opening 32 of the chute 30. As the chamber 36 allows dust and water which enters the aperture 110 to flow through the chamber 36 and out of the chute 30 via the passageway 34, the chamber 36 can be considered as forming a through passageway 37 which extends between the aperture 110 in the top lid 108 the second opening 159 in the base 160 of the housing 106. The passageway 34 and chute 30 extend from the second opening 159 away from the housing 106. The passageway 34 and chute 30 may be considered as part of the through passageway 37, and so the through passageway 37 extends through the entire housing 106.

The sloped base 160 encourages dust and water to exit the housing 106 rather than remain at the bottom of the housing 106. In order to prevent the inside of the housing 106 of the conveyor module from becoming clogged up with debris that may enter the housing 106 between the top lid 108 and the omnidirectional wheel 104, but that cannot exit through the chute, the shape and sizing of the aperture 110 can be modified. In particular, the clearance between the aperture 110 and the omnidirectional wheel 104 can be up to 3.2 mm, while the chute can have a width of 5.8 mm. Similar considerations are made for long, slender pieces of debris, in which the maximum length of debris that could fit through the gap between the aperture 110 and the omnidirectional wheel 104 measures 53 mm, which in some cases is also the length of the chute.

The invention claimed is:

1. A conveying system for conveying objects comprising:
    a plurality of conveyor modules, each conveyor module comprising:
        at least one rotatable element comprising an engagement surface configured to engage with a surface of an object to be conveyed;
        a driving mechanism configured to rotate the at least one rotatable element such that rotation of the at least one rotatable element causes rotation of the engagement surface and thereby movement of the object; and
        a control mechanism configured to control rotation of the rotatable element via the driving mechanism, wherein the control mechanism comprises a printed circuit board; and
    a conveying frame comprising:
        a plurality of apertures, each aperture configured to receive a conveyor module so as to form an array of conveyor modules that together provide a substantially planar conveying surface for conveying objects thereon; and
        a control system configured to communicate with the control mechanism of the conveyor module;
    wherein each conveyor module is configured to be releasably mounted within an aperture; and
    wherein mounting a conveyor module within an aperture establishes a direct physical electrical connection between the control mechanism and the control system, which facilitates electrical communication between the control system and the mounted conveyor module.

2. The conveying system of claim 1, wherein the printed circuit board is arranged to extend externally from the conveyor module; and wherein the conveying frame comprises a socket configured to house at least part of the control system and to receive the printed circuit board of the control mechanism.

3. The conveying system of claim 2, wherein the socket is configured to provide a guide to facilitate the direct physical connection between the printed circuit board of the control mechanism and the control system.

4. The conveying system of claim 3, wherein the socket comprises an opening wherein the opening comprises at least one internal side which tapers inwardly from the opening in the socket towards the control system.

5. The conveying system of claim 4, wherein the opening comprises an inverted pyramidal shape.

6. The conveying system of claim 1, wherein the conveyor module further comprises a housing configured to at least partially house the at least one rotatable element, and a casing that is external to the housing, wherein the casing is configured to at least partially house the driving mechanism and at least partially house the control mechanism such that a portion of the control mechanism extends beyond the casing.

7. The conveying system of claim 6, wherein the casing is configured to be releasably attached to the housing using an interlocking mechanism that comprises a first interlock member and a second interlock member provided on the casing and housing, respectively, the first and second interlock members arranged to releasably engage with each other in order to releasably attach the casing to the housing.

8. A conveyor module for a conveying system that includes a conveying frame having a plurality of apertures configured to receive the conveyor module whereby to form part of conveying surface for conveying objects, the conveyor module comprising:
    at least one rotatable element comprising an engagement surface configured to engage with a surface of an object to be conveyed;
    a housing wherein the at least one rotatable element is arranged to be rotatably mounted within a chamber defined by the housing,
    the housing comprising a first opening to the chamber, wherein at least a portion of the engagement surface extends through the first opening;
    a lid arranged to at least partially cover the first opening, the lid comprising an aperture arranged to receive the portion of the engagement surface that extends through the first opening; and
    a through passageway extending between the aperture in the lid and a second opening in a base of the housing to allow fluid or objects to pass through the housing, wherein the at least one rotatable element is at least partially located within the through passageway; and
    wherein the base of the housing is sloped and the second opening is located at a lowermost part of the slope.

9. The conveyor module of claim 8, wherein the housing comprises a chute configured to extend from the second opening in the base of the housing, away from the housing, thereby extending the through passageway.

10. The conveyor module of claim 8, wherein the lid comprises a rectangular outer perimeter, at least one corner of which has a substantially triangular protrusion configured to cooperate with a corresponding triangular protrusion on another such conveyor module whereby to form at least part of a transport surface for conveying objects across.

11. The conveying system of claim 10, wherein the substantially triangular protrusion comprises a rounded vertex.

12. The conveyor module of claim 8, further comprising a housing configured to at least partially house the at least one rotatable element, and a casing that is external to the housing, wherein the casing is configured to at least partially house a driving mechanism for said rotatable element and to at least partially house a control mechanism for said driving mechanism such that a portion of the control mechanism extends beyond the casing.

13. The conveyor module of claim 12, wherein the casing is configured to be releasably attached to the housing.

14. The conveying system of claim 13, wherein the casing is configured to be releasably attached to the housing using an interlocking mechanism.

15. The conveyor module of claim 8, wherein the conveyor module is configured to be releasably mounted within an aperture of a conveying frame, wherein mounting a conveyor module within an aperture establishes a direct physical electrical connection between the conveyor module and the conveying frame in order to facilitate electrical communication between the conveying frame and the mounted conveyor module.

16. A conveying surface for conveying objects within a conveying system, the conveying surface comprising:

a plurality of conveyor modules having at least one rotatable element comprising an engagement surface configured to engage with a surface of an object to be conveyed, the conveyor modules arranged adjacent each other to define a substantially planar transport surface over which an object can be conveyed;

wherein each of the plurality of conveyor modules comprises an upper portion having at least one corner with a substantially triangular protrusion configured to cooperate with a corresponding triangular protrusion on an adjacent conveyor module whereby to form part of the transport surface.

17. The conveying surface of claim 16, wherein the upper portion of each conveyor module comprises a substantially rectangular outer perimeter, preferably wherein the outer perimeter has an inward taper.

18. The conveying surface of claim 16, wherein the plurality of conveyor modules are arranged such that the upper portion of each adjacent conveyor module is rotated substantially 90 degrees compared to its adjacent neighbouring conveyor modules within the transport surface.

* * * * *